(12) United States Patent
Guo et al.

(10) Patent No.: US 12,537,488 B2
(45) Date of Patent: Jan. 27, 2026

(54) WIRELESS COMMUNICATION APPARATUS, SYSTEM, AND SIGNAL PROCESSING METHOD

(71) Applicant: Huawei Technologies Co., Ltd., Shenzhen (CN)

(72) Inventors: Yan Guo, Shanghai (CN); Feng Li, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 585 days.

(21) Appl. No.: 18/050,754

(22) Filed: Oct. 28, 2022

(65) Prior Publication Data

US 2023/0072811 A1 Mar. 9, 2023

Related U.S. Application Data

(63) Continuation of application No. PCT/CN2020/088529, filed on Apr. 30, 2020.

(51) Int. Cl.
*H03F 3/24* (2006.01)
*H03F 1/02* (2006.01)
(Continued)

(52) U.S. Cl.
CPC ........... *H03F 3/245* (2013.01); *H03F 1/0211* (2013.01); *H04B 1/40* (2013.01); *H04L 5/14* (2013.01);
(Continued)

(58) Field of Classification Search
CPC .. H03F 3/245; H03F 1/0211; H03F 2200/105; H03F 2200/165;
(Continued)

(56) References Cited

U.S. PATENT DOCUMENTS 6,157,253 A * 12/2000 Sigmon ................. H03F 1/0222
330/10
10,200,067 B1 * 2/2019 Adabi .................... H04B 1/406
(Continued)

FOREIGN PATENT DOCUMENTS

CN 109962683 A 7/2019

OTHER PUBLICATIONS

Y. Guo, C. Yu, and A. Zhu, "Power Adaptive Digital Predistortion for Wideband RF Power Amplifiers With Dynamic Power Transmission," IEEE Transactions on Microwave Theory and Techniques, vol. 63, Issue 11, pp. 3595-3607, Nov. 11, 2015.
(Continued)

*Primary Examiner* — Andrea Lindgren Baltzell
*Assistant Examiner* — Khiem D Nguyen
(74) *Attorney, Agent, or Firm* — Slater Matsil, LLP

(57) ABSTRACT

This application discloses a wireless communication apparatus and a signal processing method. The wireless communication apparatus includes a power amplifier and a bias circuit. The power amplifier includes a signal input port, a signal output port, a power supply port, and a bias port. The power amplifier is configured to: receive a power supply signal through the power supply port, receive a bias signal through the bias port, receive a radio frequency signal through the signal input port, and output a power amplified radio frequency signal. The bias circuit is configured to generate the bias signal. A timing feature of the bias signal is synchronized with a timing feature of a switch signal of a power amplifier, to compensate for a nonlinear change in the TDD scenario.

20 Claims, 16 Drawing Sheets

(51) Int. Cl.
*H04B 1/40* (2015.01)
*H04L 5/14* (2006.01)
(52) U.S. Cl.
CPC .. *H03F 2200/105* (2013.01); *H03F 2200/165* (2013.01); *H03F 2200/451* (2013.01)
(58) Field of Classification Search
CPC .... H03F 2200/451; H03F 1/3247; H03F 3/68; H03F 3/72; H03F 2200/102; H03F 1/0222; H03F 1/0266; H03F 3/195
USPC ........................................ 330/296, 285, 297
See application file for complete search history.

(56) References Cited

U.S. PATENT DOCUMENTS 10,666,211 B2 * 5/2020 Hwang .................... H03F 3/21
2007/0111686 A1 * 5/2007 Lee ...................... H03F 1/0211
455/127.3

OTHER PUBLICATIONS

P. M. Tom, et al., "Hybrid Analog/Digital Linearization of GaN HEMT-Based Power Amplifiers," IEEE Transactions on Microwave Theory and Techniques, vol. 67, Issue 1, pp. 288-294, Nov. 2018, 7 pages total.

* cited by examiner

FIG. a: voltage of a bias signal=2.4 V

FIG. b: voltage of a bias signal=2.4 V+d(n)

WIRELESS COMMUNICATION APPARATUS, SYSTEM, AND SIGNAL PROCESSING METHOD

CROSS-REFERENCE TO RELATED APPLICATIONS

This application is a continuation of International Application No. PCT/CN2020/088529, filed on Apr. 30, 2020, the disclosure of which is hereby incorporated by reference in its entirety.

TECHNICAL FIELD

This application relates to the field of wireless communication technologies, and in particular, to a wireless communication apparatus and system, and a signal processing method.

BACKGROUND

A radio frequency power amplifier (PA) is a key component in a transmit link of a modern communication system. A main function of the power amplifier is to amplify a low-power signal to a rated power level specified in a communication system standard by using a direct current function. Then, the signal is fed into back-end components (such as duplexers and antennas) for wireless transmission.

In the communication system, to improve energy conversion efficiency of the PA, the PA is usually required to work in a saturation interval. In this case, the PA presents a very strong nonlinear feature. The nonlinear feature of the PA deteriorates transmission quality of a system and affects an adjacent frequency band system. To resist the nonlinear feature of the PA, a digital predistortion (DPD) technology is introduced. A basic principle of the DPD technology is as follows: A distortion feature of the PA is fitted by using a nonlinear behavior model, an inverse function of the distortion feature of the PA is obtained based on a fitting result, and then the inverse function is implemented in a digital baseband/intermediate frequency by using a digital circuit. In this way, before being sent, a signal passes through two nonlinear modules with opposite features: DPD and PA. Distortion features of the two nonlinear modules cancel with each other, to obtain a linear system transmission feature.

The essence of a DPD system is to identify and model the nonlinear feature of the PA. Therefore, the PA feature used for modeling needs to be the same as or slightly changed after modeling. Otherwise, a learned PA feature is not a used PA feature. As a result, the system deteriorates in performance or even does not work.

In a time division duplex (TDD) scenario, an input signal of the PA is sometimes high and sometimes low, and an input signal of the PA used during modeling is constant. Therefore, in the TDD scenario, a case of "a learned PA feature is not a used PA feature" occurs. As a result, the system deteriorates in performance or even does not work.

SUMMARY

Embodiments of this application provide a wireless communication apparatus, system, and method, to help stabilize a feature of a PA in a TDD scenario, and further help improve linear performance of a DPD system.

To achieve the foregoing objective, this application uses the following technical solutions.

According to a first aspect, a wireless communication apparatus is provided. The wireless communication apparatus includes a power amplifier and a bias circuit. The power amplifier includes a signal input port, a signal output port, a power supply port, and a bias port. The power amplifier is configured to: receive a power supply signal through the power supply port, receive a bias signal through the bias port, receive a radio frequency signal through the signal input port, and output a radio frequency signal obtained after power amplification through the signal output port. The bias circuit is connected to the bias port, and is configured to generate the bias signal. A timing feature of the bias signal is synchronized with a timing feature of a switch signal of the power amplifier in a time division duplex TDD scenario, to compensate for a nonlinear change of the power amplifier in the TDD scenario.

The switch signal of the power amplifier is used to control timing of switching on or off the power amplifier.

In this solution, in the TDD scenario, the timing feature of the bias signal of the power amplifier is synchronized with the timing feature of the switch signal of the power amplifier. Because an input signal of the switch signal of the power amplifier in the TDD scenario is sometimes high and sometimes low, the bias signal of the power amplifier is sometimes high and sometimes low. In other words, in this solution, voltage of the bias signal of the power amplifier is not a constant value. However, in the conventional technology, the voltage of the bias signal of the power amplifier is a constant value in the TDD scenario. Therefore, compared with the conventional technology, this technical solution changes the voltage value of the bias signal. Further, because the bias signal affects a signal transmission feature of the power amplifier, changing the voltage value of the bias signal helps change the signal transmission feature of the power amplifier. This helps stabilize the feature of the power amplifier in the TDD scenario (that is, a degree of nonlinear change is reduced), and helps improve linear performance of a DPD system (including a DPD and a power amplifier).

In a possible design, the bias circuit includes a smooth filter circuit, configured to receive the switch signal of the power amplifier, and perform smooth filtering on the switch signal of the power amplifier, to generate the bias signal In this solution, smooth filtering is directly performed on the switch signal of the power amplifier to generate the bias signal.

Optionally, the bias circuit further includes a signal obtaining circuit, configured to generate the switch signal of the power amplifier. The signal obtaining circuit herein may be implemented by using a module/component that generates a switch signal of a power amplifier in the conventional technology. Therefore, a bias signal can be generated by processing the switch signal of the power amplifier in the conventional technology without using a dedicated module/component. This helps reduce hardware overheads, and helps reduce implementation complexity and costs of signal processing. In addition, implementation complexity and costs of digital signal processing such as the DPD do not need to be increased.

In a possible design, the bias circuit includes a smooth filter circuit, configured to receive a TDD timing signal, and perform smooth filtering on the TDD timing signal to generate the bias signal.

The TDD timing signal is used to control timing of switching on or off signal transmission of the TDD system.

Optionally, the bias circuit further includes: a signal obtaining circuit, configured to generate the TDD timing signal. The signal obtaining circuit herein may be implemented by using a module/component that generates a TDD timing signal in the conventional technology. Therefore, a bias signal can be generated by processing the TDD timing signal in the conventional technology without using a dedicated module/component. This helps reduce hardware overheads, and helps reduce implementation complexity and costs of signal processing. In addition, implementation complexity and costs of digital signal processing such as the DPD do not need to be increased.

In a possible design, the wireless communication apparatus is used in an ET system. The bias circuit includes a smooth filter circuit, configured to receive an envelope signal of the ET system, and perform smooth filtering on the envelope signal to generate the bias signal.

The bias circuit further includes a signal obtaining circuit, configured to generate the envelope signal. The signal obtaining circuit herein may be implemented by using a module/component that generates an envelope signal in the conventional technology. Therefore, a bias signal can be generated by processing the envelope signal in the conventional technology without using a dedicated module/component. This helps reduce hardware overheads, and helps reduce implementation complexity and costs of signal processing. In addition, implementation complexity and costs of digital signal processing such as the DPD do not need to be increased.

According to a second aspect, a wireless communication apparatus is provided, including a power amplifier and a bias circuit. The power amplifier is used in a TDD scenario. The power amplifier includes a signal input port, a signal output port, a power supply port, and a bias port. The power amplifier is configured to: receive a power supply signal through the power supply port, receive a bias signal through the bias port, receive a radio frequency signal through the signal input port, and output a radio frequency signal obtained after power amplification through the signal output port. The bias circuit is connected to the bias port of the power amplifier, and is configured to receive a target signal, and generate the bias signal based on the target signal. The target signal includes a switch signal of the power amplifier, a TDD timing signal, or an envelope signal of an ET system.

In this solution, in the TDD scenario, the bias signal is generated based on the switch signal of the power amplifier, the TDD timing signal, or the envelope signal. The switch signal, the TDD timing signal, and the envelope signal of the power amplifier all have a time-high and time-low feature, and the timing features of the switch signal, the TDD timing signal, and the envelope signal are synchronized. Therefore, the bias signal of the power amplifier to have a time-high and time-low feature. In other words, in this solution, voltage of the bias signal of the power amplifier is not a constant value. However, in the conventional technology, the voltage of the bias signal of the power amplifier is a constant value in the TDD scenario. Therefore, compared with the conventional technology, this technical solution changes the voltage value of the bias signal. Further, changing the voltage value of the bias signal helps change a transmission feature of the power amplifier, thereby helping stabilize the feature of the power amplifier in the TDD scenario, and further helping improve linear performance of a DPD system.

In a possible design, the bias circuit includes a smooth filter circuit, configured to receive the target signal, and perform smooth filtering on the target signal, to generate the bias signal.

In a possible design, the bias circuit further includes a signal obtaining circuit, configured to generate the target signal.

Based on any technical solution provided in the first aspect or the second aspect, the following provides several optional solutions.

Optionally, the wireless communication apparatus includes a plurality of power amplifiers and at least one bias circuit. The at least one bias circuit is connected to bias ports of the plurality of power amplifiers In other words, the plurality of power amplifiers may share one bias circuit. This helps reduce hardware resource overheads, reduce hardware implementation costs, and reduce a hardware volume. Therefore, the technical solution is especially applicable to a device that has a relatively strict requirement on costs and a volume.

Optionally, the foregoing the plurality of power amplifiers respectively belong to different radio frequency transmit channels. The different radio frequency transmit channels are used for multiple-input multiple-output MIMO communication.

According to a third aspect, a wireless communication apparatus is provided. The wireless communication apparatus includes a first power amplifier and a bias circuit. The first power amplifier is configured to amplify, based on a bias signal fed into a bias port of the first power amplifier, an input signal (that is, a radio frequency signal) input from a signal input port of the first power amplifier. The bias signal is used to compensate for a feature that is of the first power amplifier and that varies with a change of an input signal in a TDD scenario (this is equivalent to that the bias signal is used to compensate for a nonlinear change of the first power amplifier in the TDD scenario). The bias circuit is connected to the bias port. The bias circuit is configured to generate the bias signal, and feed the bias signal into the bias port (that is, send the bias signal to the bias port).

Because the input signal of the power amplifier in the TDD scenario has a feature of time-high and time-low, voltage of the bias signal of the power amplifier is not a constant value. However, in the conventional technology, in the TDD scenario, the voltage of the bias signal of the power amplifier is a constant value. In other words, compared with the conventional technology, this technical solution changes the voltage value of the bias signal. Further, because the bias signal affects a signal transmission feature of the power amplifier, changing the bias signal helps change the signal transmission feature of the power amplifier. This helps stabilize the feature of the power amplifier in the TDD scenario (that is, a degree of change with a change of an input signal of the power amplifier is reduced), and helps improve linear performance of a DPD system (including a DPD and a power amplifier).

In a possible design, the bias circuit is specifically configured to generate the bias signal based on a switch signal of the first power amplifier in the TDD scenario.

In a possible design, the bias circuit includes: a switch signal generation unit, configured to generate the switch signal of the first power amplifier; a digital shaping unit, configured to shape the switch signal of the first power amplifier; and a DAC, configured to perform digital-to-analog conversion on a shaped signal to obtain the bias signal.

In a possible design, the bias circuit includes: a switch signal generation unit, configured to generate the switch signal of the first power amplifier; a DAC, configured to perform digital-to-analog conversion on the switch signal of the first power amplifier, to obtain an analog signal of the switch signal of the first power amplifier; and an analog shaping unit, configured to shape the analog signal of the switch signal of the first power amplifier to obtain the bias signal.

In a possible design, the bias circuit is specifically configured to generate the bias signal based on a TDD timing signal.

In a possible design, the bias circuit includes: a TDD timing generation unit, configured to generate the TDD timing signal; a digital shaping unit, configured to shape the TDD timing signal; and a DAC, configured to perform digital-to-analog conversion on a shaped signal to obtain the bias signal.

In a possible design, the bias circuit includes: a TDD timing generation unit, configured to generate the TDD timing signal; a DAC, configured to perform digital-to-analog conversion on the TDD timing signal to obtain an analog signal of the TDD timing signal; and an analog shaping unit, configured to shape the analog signal of the TDD timing signal to obtain the bias signal.

In a possible design, the wireless communication apparatus is used in an ET system. The bias circuit is specifically configured to generate the bias signal based on an envelope signal of the ET system.

In a possible design, the bias circuit includes: an envelope generation unit, configured to generate the envelope signal; a digital shaping unit, configured to shape the envelope signal; and a DAC, configured to perform digital-to-analog conversion on a filtered signal, to obtain the bias signal.

In a possible design, the bias circuit includes: an envelope generation unit, configured to generate the envelope signal; a DAC, configured to perform digital-to-analog conversion on the envelope signal, to obtain an analog signal of the envelope signal; and an analog shaping unit, configured to shape the analog signal, to obtain the bias signal.

The switch signal generation unit, the TDD timing generation unit, and the envelope generation unit may all be implemented by using a module/component in generating an envelope signal of an ET system in the conventional technology. This helps reduce hardware overheads, and helps reduce implementation complexity and costs of signal processing.

In a possible design, the wireless communication apparatus further includes a training unit. A signal input port of the training unit is connected to the signal input port and the signal output port of the first power amplifier. A signal output port of the training unit is connected to a first DPD. The bias circuit is further configured to adjust a parameter of the bias circuit to generate a pre-bias signal. The bias signal is a pre-bias signal that meets "compensating for a feature that the first power amplifier changes with an input signal in the TDD scenario". The pre-bias signal is used to adjust a relationship between an output signal and an input signal of the first power amplifier. The training unit is configured to perform training based on the output signal and the input signal of the first power amplifier to obtain a model coefficient of the first DPD, and send the model coefficient to the first DPD. The model coefficient enables the feature of the first DPD to meet an inverse function of "a feature (that is, a signal transmission feature of the first power amplifier) that the output signal of the first power amplifier changes with the input signal in the TDD scenario". In this case, the first DPD is specifically configured to perform predistortion processing on a first signal to be processed based on the model coefficient. The bias circuit is specifically configured to generate the bias signal based on a target parameter. The target parameter is a parameter of the bias circuit when the training unit obtains the model coefficient.

In this technical solution, the parameter of a bias circuit is adjusted, so that the signal transmission feature of the first power amplifier changes. Then, a feedback loop is disposed to track the change. Tracked information is trained to obtain the model coefficient of the first DPD and the parameter used for generating the bias signal when a condition "a feature that the output signal of the first power amplifier changes with the input signal in the TDD scenario" is met. This is merely an example of obtaining the model coefficient of the first DPD and the parameter used to generate the bias signal. Embodiments of this application is not limited thereto.

In a possible design, the training unit is specifically configured to perform training based on the output signal and the input signal of the first power amplifier and a model extraction algorithm, to obtain the model coefficient of the first DPD. Optionally, the model extraction algorithm includes a least square method or a least mean square error algorithm.

In a possible design, the wireless communication apparatus includes a first sending channel and a second sending channel. The first sending channel includes the first power amplifier and the first DPD. The second sending channel includes a second power amplifier, configured to amplify, based on a bias signal fed into a bias port of the second power amplifier, an input signal received by a signal input port of the second power amplifier. The bias signal is further used to compensate for a feature that the second power amplifier changes with an input signal in the TDD scenario. Based on this technical solution, in a MIMO scenario, power amplifiers of a plurality of sending channels may share one bias signal. This helps reduce hardware resource overheads, reduce hardware implementation costs, and reduce a hardware volume. Therefore, the technical solution is especially applicable to a device that has a relatively strict requirement on costs and a volume.

According to a third aspect, a signal processing method is provided, applied to a wireless communication apparatus, where the wireless communication apparatus includes a power amplifier. The method includes: generating a bias signal, where a timing feature of the bias signal is synchronized with a timing feature of a switch signal of the power amplifier in a TDD scenario, to compensate for a nonlinear change of the power amplifier in the TDD scenario; and enabling the power amplifier, and amplifying, based on the bias signal and a power supply signal, an input signal of the power amplifier.

In a possible design, the generating a bias signal includes: performing smooth filtering on the switch signal of the power amplifier to generate the bias signal.

In a possible design, the method further includes: generating the switch signal of the power amplifier.

In a possible design, the generating a bias signal includes: performing smooth filtering on a TDD timing signal to generate the bias signal.

In a possible design, the method further includes: generating the TDD timing signal.

In a possible design, the wireless communication apparatus is used in an ET system. The generating a bias signal includes: performing smooth filtering on an envelope signal of the ET system to generate the bias signal.

In a possible design, the method further includes: generating the envelope signal.

According to a fourth aspect, a signal processing method is provided, applied to a wireless communication apparatus, where the wireless communication apparatus includes a power amplifier. The method includes: generating a bias signal based on a target signal, where the target signal includes a switch signal of the power amplifier, a TDD timing signal, or an envelope signal of an ET system; and enabling the power amplifier, and amplifying, based on the bias signal and a power supply signal, an input signal of the power amplifier.

In a possible design, the method further includes: generating the target signal.

Based on any method provided in the third aspect or the fourth aspect, the following provides several optional implementations.

Optionally, the wireless communication apparatus includes a plurality of power amplifiers. At least two power amplifiers in the plurality of power amplifiers share the bias signal.

Optionally, the plurality of power amplifiers respectively belong to different radio frequency transmit channels. The different radio frequency transmit channels are used for MIMO communication.

According to a sixth aspect, a signal processing method is provided, applied to a wireless communication apparatus, where the wireless communication apparatus includes a first power amplifier. The method includes: generating a bias signal, where the bias signal is used to compensate for a feature that the first power amplifier changes with an input signal in a TDD scenario; and enabling the first power amplifier, and amplifying, based on the bias signal and the power supply signal, an input signal of the first power amplifier.

In a possible design, the generating a bias signal includes: generating the bias signal based on a switch signal of the power amplifier.

In a possible design, the generating a bias signal based on a TDD timing signal includes: generating the switch signal of the power amplifier; shaping the switch signal of the power amplifier, and performing digital-to-analog conversion on a shaped signal to obtain the bias signal.

In a possible design, the generating a bias signal based on a switch signal of a power amplifier includes: generating the switch signal of the power amplifier, performing digital-to-analog conversion on the switch signal of the power amplifier, to obtain an analog signal of the switch signal of the power amplifier, and shaping the analog signal of the switch signal of the power amplifier to obtain the bias signal.

In a possible design, the generating a bias signal includes: generating the bias signal based on the TDD timing signal.

In a possible design, the generating a bias signal based on a TDD timing signal includes: generating the TDD timing signal, shaping the TDD timing signal, and performing digital-to-analog conversion on a shaped signal, to obtain the bias signal.

In a possible design, the generating a bias signal based on a TDD timing signal includes: generating the TDD timing signal, performing digital-to-analog conversion on the TDD timing signal to obtain an analog signal of the TDD timing signal, and shaping the analog signal of the TDD timing signal to obtain the bias signal.

In a possible design, the wireless communication apparatus is used in an ET system. In this case, the generating a bias signal includes: generating the bias signal based on an envelope signal of the ET system.

In a possible design, the generating the bias signal based on an envelope signal of the ET system includes: generating the envelope signal, shaping the envelope signal, and performing digital-to-analog conversion on a shaped envelope signal, to obtain the bias signal.

In a possible design, the generating the bias signal based on an envelope signal of the ET system includes: generating the envelope signal, performing digital-to-analog conversion on the envelope signal to obtain an analog signal of the envelope signal, and shaping the analog signal to obtain the bias signal.

In a possible design, the method further includes: adjusting a parameter of the wireless communication apparatus, to generate a pre-bias signal. The bias signal is a pre-bias signal that meets compensating for a feature that the first power amplifier changes with an input signal in the TDD scenario. The pre-bias signal is used to adjust a relationship between an output signal and an input signal of the first power amplifier. Then, training is performed based on the output signal and the input signal of the first power amplifier, to obtain a model coefficient used during predistortion processing. The model coefficient enables a feature of predistortion processing to meet an inverse function of a feature that the output signal of the first power amplifier changes with the input signal in the TDD scenario. In this case, the generating a bias signal includes: generating the bias signal based on a target parameter. The target parameter is a parameter of the wireless communication apparatus when the model coefficient is obtained. The performing predistortion processing on a first signal to be processed includes: preprocessing the first signal to be processed based on the model coefficient.

In a possible design, the performing training based on the output signal and the input signal of the first power amplifier, to obtain a model coefficient used during predistortion processing includes: performing training based on the output signal and the input signal of the first power amplifier and a model extraction algorithm, to obtain the model coefficient used during predistortion processing. For example, the model extraction algorithm includes a least square method or a least mean square error algorithm.

In a possible design, the wireless communication apparatus includes a first sending channel and a second sending channel. The first sending channel includes the first power amplifier, and the second sending channel includes a second power amplifier. In this case, the method further includes: performing predistortion processing on a second signal to be processed to obtain a second signal, to compensate for a distortion feature of the second power amplifier. An input signal of the second power amplifier is amplified by using the second power amplifier based on the bias signal. The input signal of the second power amplifier is generated based on the second signal. In this case, the bias signal is further used to compensate for a feature that the second power amplifier changes with an input signal in the TDD scenario.

Components in any wireless communication apparatus provided based on any one of the foregoing aspects or in any wireless communication apparatus in the method provided above are integrated into one chip. Alternatively, different components in the wireless communication apparatus are integrated into different chips.

Optionally, the wireless communication apparatus is integrated into a radio frequency front-end (RFFE) component.

Optionally, the wireless communication apparatus is integrated into a radio frequency integrated circuit (RFIC).

Optionally, the wireless communication apparatus is used in the ET system, and the wireless communication apparatus is integrated into an ET chip.

According to a seventh aspect, a wireless communication system is provided, including a base station and a terminal.

The base station or the terminal includes any wireless communication apparatus provided in the first aspect to the third aspect.

According to an eighth aspect, a wireless communication apparatus is provided. The apparatus includes a memory, and one or more processors. The memory is configured to store computer instructions, and the processor is configured to invoke the computer instructions, to perform any signal processing method provided in the fourth aspect to the sixth aspect.

According to a ninth aspect, a computer-readable storage medium is provided, for example, a non-transient computer-readable storage medium. A computer program (or instructions) is stored on the computer-readable storage medium. When the computer program (or the instructions) is run on a computer (for example, a wireless communication apparatus), the computer is enabled to perform any method provided in the fourth aspect to the sixth aspect.

According to a tenth aspect, a computer program product is provided. When the computer program product runs on a computer, any method provided in the fourth aspect to the sixth aspect is performed.

It may be understood that any method, system, computer-readable storage medium, and computer program product provided above may be applied to the wireless communication apparatus provided above. Therefore, for beneficial effects that can be achieved by the method, the system, the computer-readable storage medium, and the computer program product, refer to beneficial effects in the corresponding wireless communication apparatus. Details are not described herein again.

In this application, names of the foregoing apparatuses or functional modules do not constitute a limitation on devices or functional modules. During actual implementation, these devices or functional modules may have other names. Each device or functional module falls within the scope defined by the claims and their equivalent technologies in this application, provided that a function of the device or functional module is similar to that described in this application.

These aspects or other aspects in this application are more concise and comprehensible in the following descriptions.

DETAILED DESCRIPTION OF ILLUSTRATIVE EMBODIMENTS

Figure 1:
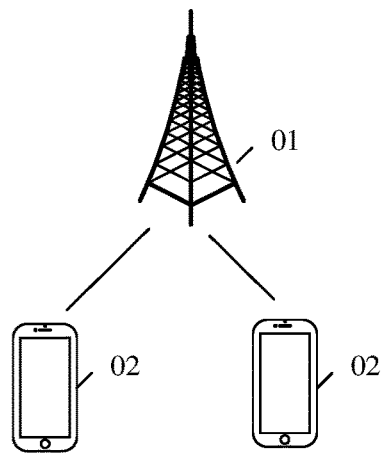
FIG. 1 is a schematic diagram of a structure of a wireless communication system according to an embodiment of this application.

The technical solutions provided in embodiments of this application are mainly applicable to a wireless communication system. The wireless communication system may comply with a wireless communication standard in the $3^{rd}$ generation partnership project (3GPP), or may comply with another wireless communication standard, for example, a wireless communication standard in the 802 series standards (for example, 802.11, 802.15, or 802.20) of the Institute of Electrical and Electronics Engineers (IEEE).

It should be understood that in a wireless communication system, devices may be classified into devices that provide a wireless network service and devices that use a wireless network service. The devices that provide the wireless network service are devices that form a wireless communication network, and may be briefly referred to as network equipment or network elements. Network devices usually belong to carriers (such as China Mobile and Vodafone) or infrastructure providers (such as tower companies). The network devices may further be classified into a radio access network (RAN) device and a core network (CN) device. The RAN device typically includes a base station (BS).

It should be understood that the base station may also sometimes be referred to as a wireless access point (AP) or a transmission reception point (TRP). Specifically, the base station may be a universal NodeB (next generation NodeB, gNB) in a 5 G new radio (NR) system or an evolved NodeB (eNB) in a 4 G long term evolution (LTE) system. Base stations may be classified into a macro base station or a micro base station based on different physical forms or transmit powers of the base stations. The micro base station is also sometimes referred to as a small base station or a small cell.

The devices that use the wireless network service are usually located on an edge of a network, and may be briefly referred to as terminals. The terminal can establish a connection to the network device, and provide a wireless communication service for a user based on a service of the network device. It should be understood that, because the terminal has a closer relationship with the user, the terminal is also sometimes referred to as user equipment (UE) or a subscriber unit (SU). In addition, compared with a base station that is usually placed at a fixed position, the terminal usually moves along with the user, and is also sometimes referred to as a mobile station (MS). In addition, some network devices such as a relay node (RN) or a wireless router may also sometimes be considered as terminals because the network devices have a UE identity or belong to the user.

Specifically, the terminal may be a mobile phone, a tablet computer, a laptop computer, a wearable device (for example, a smartwatch, a smart band, a smart helmet, or smart glasses), other devices that have a wireless access capability, for example, an intelligent vehicle, various internet of things (IOTs) devices including various smart home devices (such as a smart meter and a smart home appliance) and smart city devices (such as a security or monitoring device and an intelligent road transportation facility), and the like.

For ease of description, in this application, a base station and a terminal are used as examples for description. FIG. 1 is a schematic diagram of a structure of a wireless communication system according to an embodiment of this application. The wireless communication system shown in FIG. 1 includes a base station 01 and a terminal 02.

In the wireless communication system, the base station 01 may provide communication coverage for a specific geographical area by using an integrated or external antenna device. One or more terminals 02 in a communication coverage area of the base station 01 may be connected to the base station 01.

In the wireless communication system, the terminal 02 and the base station 01 need to know configurations predefined by the wireless communication system, including a radio access technology (RAT) supported by the system and a configuration of a radio resource stipulated by the system, for example, basic configurations of a radio frequency band and a carrier. The configurations predefined by the system may be used as a part of a standard protocol for the wireless communication system, or may be determined through interaction between the terminal 02 and the base station 01. Content of a related standard protocol may be prestored in memories of the terminal 02 and the base station 01, or reflected as hardware circuits or software code of the terminal 02 and the base station 01.

In the wireless communication system, the terminal 02 and the base station 01 each support one or more same RATs, for example, 5 G NR, 4 G LTE, or a RAT for a future evolved system. Specifically, the terminal 02 and the base station 01 each use a same air interface parameter, a same coding scheme, a same modulation scheme, and the like, and communicate with each other based on the radio resource stipulated by the system.

Figure 2:
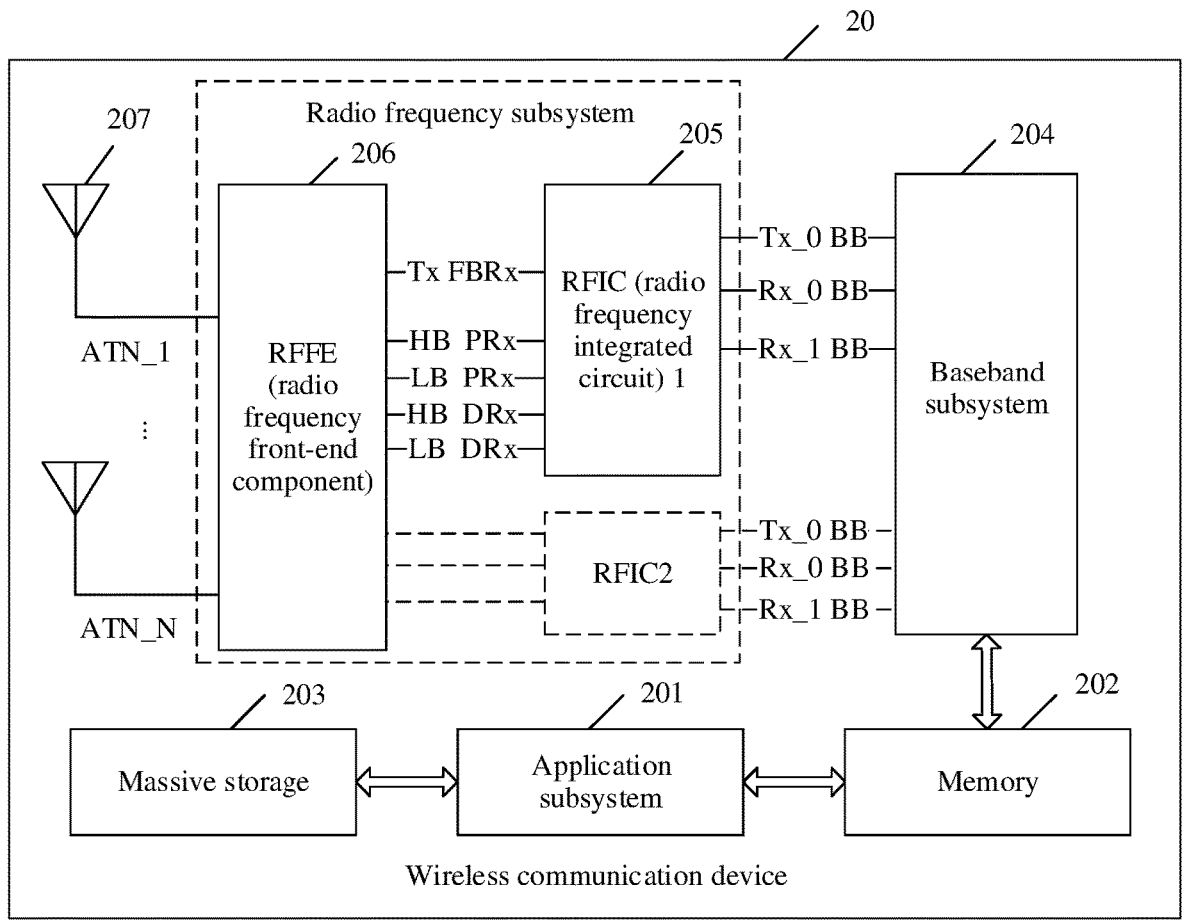
FIG. 2 is a schematic diagram of a structure of a wireless communication device according to an embodiment of this application.

FIG. 2 is a schematic diagram of a structure of a wireless communication device 20 according to an embodiment of this application. The wireless communication device 20 may be the terminal 02 or the base station 01. As shown in FIG. 2, the wireless communication device 20 may include a plurality of components, for example, an application subsystem 201, a memory 202, a massive storage 203, a baseband subsystem 204, a radio frequency integrated circuit (RFIC) 205, a radio frequency front-end (RFFE) component 206, and an antenna (ANT) 207. These components may be coupled through various interconnection buses or in other electrical connection manners.

In FIG. 2, ANT_1 represents a first antenna, ANT_N represents an $N^{th}$ antenna, and N is a positive integer greater than 1. Tx represents a transmit path, and Rx represents a receive path. Different numbers represent different paths. Each path may represent a signal processing channel. FBRx represents a feedback receive path, PRx represents a primary receive path, and DRx represents a diversity receive path. HB represents a high band, LB represents a low band, and HB or LB indicates that a band is comparatively high or low. BB represents a baseband. It should be understood that marks and components in FIG. 2 are merely used for illustration, and are merely used as a possible implementation. Embodiments of this application further include another implementation. For example, the wireless communication device 20 may include more or fewer paths and more or fewer components.

The application subsystem 201 may be used as a main control system or a main computing system of the wireless communication device 20, and is configured to: run a main operating system and an application program, manage software and hardware resources of the entire wireless communication device 20, and provide a user operation interface for a user. The application subsystem 201 may further include driver software related to another subsystem (for example, the baseband subsystem 204).

The application subsystem 201 may include one or more processors. The plurality of processors may be a plurality of processors of a same type, or may include a combination of a plurality of types of processors. In this application, the processor may be a processor for a general purpose, or may be a processor designed for a specific field. For example, the processor may be a central processing unit (CPU), a digital signal processor (DSP), or a micro control unit (MCU). Alternatively, the processor may be a graphics processing unit (GPU), an image signal processor (ISP), an audio signal processor (ASP), or an AI processor specially designed for an artificial intelligence (AI) application. The AI processor includes but is not limited to a neural network processing unit (NPU), a tensor processing unit (TPU), and a processor referred to as an AI engine.

In FIG. 2, the radio frequency integrated circuit 205 (including an RFIC1, and one or more optional RFICs 2) and the radio frequency front-end component 206 may jointly form the radio frequency subsystem. According to different signal receiving or transmitting paths, the radio frequency subsystem may also be classified into a radio frequency receive path (RF receive path) and a radio frequency transmit path (RF transmit path). The radio frequency receive channel may receive a radio frequency signal through an antenna, perform processing (such as amplification, filtering, and down-conversion) on the radio frequency signal to obtain a baseband signal, and transfer the baseband signal to the baseband subsystem 204. The radio frequency transmit path may receive a baseband signal from the baseband subsystem 204, perform radio frequency processing (such as up-conversion, amplification, and filtering) on the baseband signal to obtain a radio frequency signal, and finally radiate the radio frequency signal into space through the antenna. The radio frequency integrated circuit 205 may be referred to as a radio frequency processing chip or a radio frequency chip.

Specifically, the radio frequency subsystem may include electronic components such as an antenna switch, an antenna tuner, a low noise amplifier (LNA), a power amplifier (PA), a frequency mixer, a local oscillator (LO), and a filter. The electronic components may be integrated into one or more chips based on a requirement.

The radio frequency front-end component 206 may also be an independent chip. The radio frequency chip is sometimes referred to as a receiver, a transmitter, or a transceiver. With evolution of technologies, an antenna may sometimes be considered as a part of the radio frequency subsystem, and may be integrated into a chip of the radio frequency subsystem. The antenna, the radio frequency front-end component 206, and the radio frequency processing chip each may be manufactured and sold separately. Certainly, the radio frequency subsystem may use different components or different integration manners depending on requirements for power consumption and performance. For example, the radio frequency front-end component is integrated into the radio frequency chip, or even both the antenna and the radio frequency front-end component 206 are integrated into the radio frequency chip, and the radio frequency chip may alternatively be referred to as a radio frequency antenna module or an antenna module.

Similar to that the radio frequency subsystem mainly completes radio frequency signal processing, the baseband subsystem 204 mainly completes baseband signal processing. The baseband subsystem 204 may extract useful information or data bits from the baseband signal, or convert information or data bits into a to-be-sent baseband signal. The information or data bits may be data that represents user data or control information such as a voice, a text, or video. For example, the baseband subsystem 204 may implement modulation and demodulation, encoding and decoding, and other signal processing operations. For different radio access technologies, for example, 5 G NR and 4 G LTE, baseband signal processing operations are not completely the same.

In addition, because the radio frequency signal is an analog signal, and the baseband subsystem 204 mainly processes a digital signal, an analog-to-digital conversion component is further required in the wireless communication device 20. In this embodiment of this application, the analog-to-digital conversion component may be disposed in the baseband subsystem 204, or may be disposed in the radio frequency subsystem. The analog-to-digital conversion component includes an analog-to-digital converter (ADC) that converts an analog signal into a digital signal, and a digital-to-analog converter (DAC) that converts a digital signal into an analog signal.

Similar to the application subsystem 201, the baseband subsystem 204 may also include one or more processors. In addition, the baseband subsystem 204 may further include one or more hardware accelerators (HAC). The hardware accelerator may be configured to specially complete some sub-functions with comparatively large processing overheads, for example, assembly, parsing, encryption, and decryption of a data packet. The sub-functions may also be implemented by using a processor having a common function. However, for consideration of performance or costs, it may be more proper to use the hardware accelerator to implement the sub-functions. During specific implementation, the hardware accelerator is mainly implemented by using an application-specific integrated circuit (ASIC). Certainly, the hardware accelerator may alternatively include one or more relatively simple processors, for example, an MCU.

In this embodiment of this application, the baseband subsystem 204 and the radio frequency subsystem jointly form a communication subsystem, to provide a wireless communication function for the wireless communication device 20. Usually, the baseband subsystem 204 is responsible for managing software and hardware resources of the communication subsystem, and may configure a working parameter of the radio frequency subsystem. A sub-operating system of the communication subsystem may run in the processor of the baseband subsystem 204. The sub-operating system is usually an embedded operating system or a real time operating system, for example, a VxWorks operating system or a QuRT system of Qualcomm.

The baseband subsystem 204 may be integrated into one or more chips, and the chip may be referred to as a baseband processing chip or a baseband chip. The baseband subsystem 204 may be used as an independent chip, and the chip may be referred to as a modem or a modem chip. The baseband subsystem 204 may be manufactured and sold as a modem chip. The modem chip is sometimes referred to as a baseband processor or a mobile processor. In addition, the baseband subsystem 204 may further be integrated into a larger chip, and is manufactured and sold as the larger chip. The larger chip may be referred to as a system chip, a chip system, a system on chip (SoC), or an SoC chip for short. Software components of the baseband subsystem 204 may be built in the hardware component before delivery, may be imported from another non-volatile memory into the hardware component after delivery, or may be downloaded and updated in an online manner through a network.

In addition, the wireless communication device 20 further includes a memory, for example, the memory 202 and the mass storage 203 in FIG. 2. In addition, the application subsystem and the baseband subsystem 204 may further include one or more caches respectively. During specific implementation, there may be a volatile memory and a non-volatile memory (NVM). The volatile memory is a memory in which data stored in the memory is lost after a power supply is interrupted. Currently, volatile memories are mainly random access memories (RAM), including a static random access memory (SRAM) and a dynamic random access memory (DRAM). The non-volatile memory is a memory in which data stored in the memory is not lost even if the power supply is interrupted. Common nonvolatile memories include a read-only memory (ROM), an optical disc, a magnetic disk, various memories based on a flash memory technology, and the like. Usually, the volatile memory 202 may be used as the memory, and the non-volatile memory, for example, the magnetic disk or a flash memory, may be used as the mass storage 203.

The following describes related technologies in embodiments of this application.

(1), PA

Figure 3:
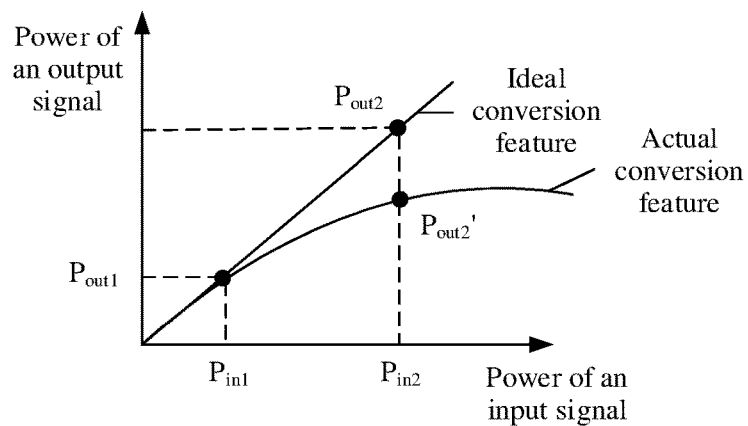
FIG. 3 is a schematic diagram of ideal conversion performance and actual conversion performance between power of an input signal and power of an output signal of a PA according to an embodiment of this application.

FIG. 3 is a schematic diagram of ideal conversion performance (that is, a linear feature) and actual conversion performance (that is, a nonlinear feature) between power of an input signal and power of an output signal of a PA. When the power of the input signal is $P_{in1}$, actual power and ideal power of the output signal are the same, that is, $P_{out1}$n. When the power of the input signal is $P_{in2}$, the actual power $P_{out2'}$ of the output signal is less than the ideal power $P_{out2}$.

Figure 4:
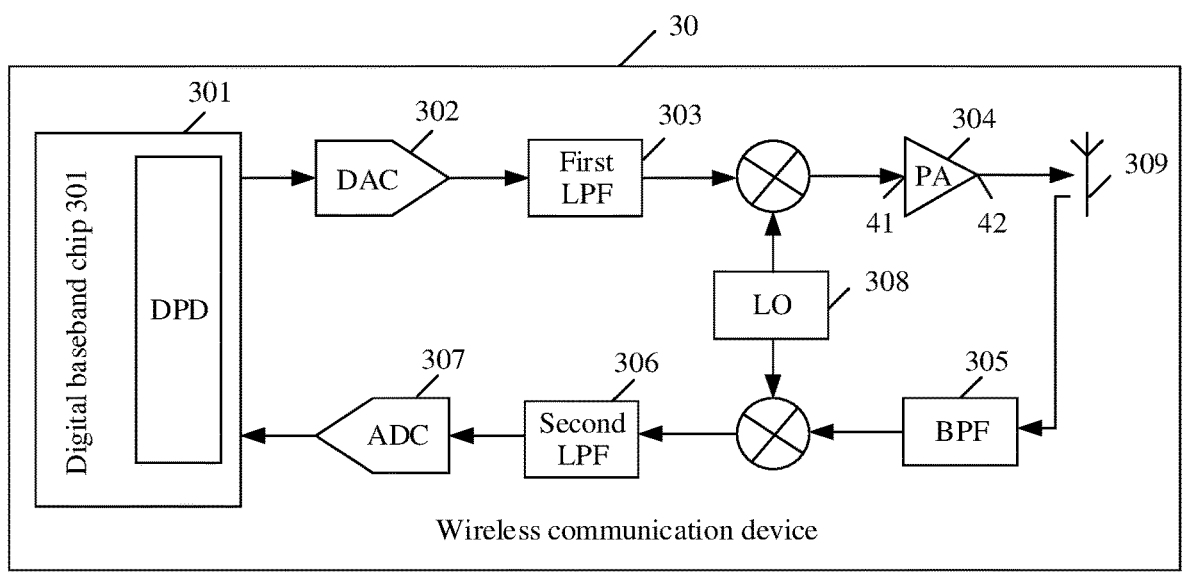
FIG. 4 is a schematic diagram of another structure of a wireless communication device according to an embodiment of this application.

FIG. 4 is a schematic diagram of a structure of a wireless communication device 30 according to an embodiment of this application, to describe a location of a PA in a wireless communication device. In FIG. 4, the wireless communication device 30 includes a digital baseband chip 301, a DAC 302, a first low-pass filter (LPF) 303, a PA 304, a band-pass filter (BPF) 305, a second LPF 306, an ADC 307, an LO 308, and an antenna 309.

The digital baseband chip 301 may be equivalent to the baseband subsystem 204 in FIG. 2. Another component may be used as a component in the radio frequency subsystem in FIG. 2. For connection relationships between these components and signal flow directions in these components, refer to FIG. 4. For functions of these components, refer to the foregoing descriptions or the conventional technology. Details are not described herein again. A structure of the wireless communication device 30 shown in FIG. 4 is merely an example, and constitutes no limitation on a structure of the wireless communication device 30 to which embodiments of this application are applicable.

Figure 5:
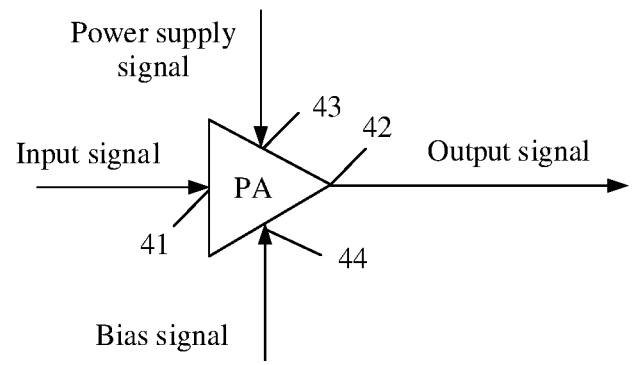
FIG. 5 is a schematic diagram of a PA according to an embodiment of this application.

It should be understood that the PA 304 in FIG. 4 includes a signal input port 41 and a signal output port 42. In addition, the PA 304 further includes a power supply port 43 and a bias port 44. FIG. 5 is a schematic diagram of the PA 304. The PA 304 is configured to: receive a power supply signal through the power supply port 43, receive a bias signal through the bias port 44, receive a radio frequency signal through the signal input port 41, and output a power-amplified radio frequency signal through the signal output port 42.

In some descriptions of this embodiment of this application, the radio frequency signal received by the signal input port of the PA may also be referred to as an input signal of the PA. The power-amplified radio frequency signal output by the signal output port of the PA may also be referred to as an output signal of the PA. This is described herein in a unified manner, and details are not described in the following again.

(2), DPD

To resist the nonlinear feature of the PA, a DPD technology is introduced in the industry. For a basic principle and the like of the DPD technology, refer to the background technology. Details are not described herein again.

Figure 6:
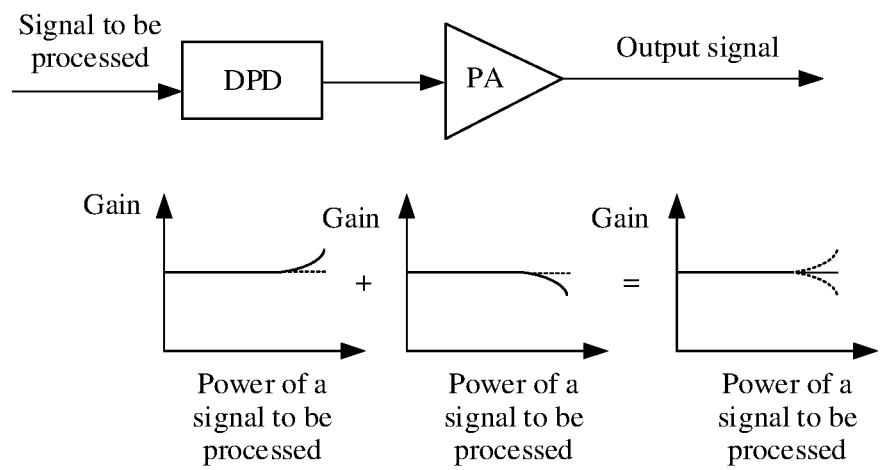
FIG. 6 is a schematic diagram of a connection relationship between a DPD and a PA, and a gain of the DPD, the PA, and a combination of the DPD and the PA according to an embodiment of this application.

FIG. 6 is a schematic diagram of a connection relationship between a DPD and a PA, and a gain of the DPD, the PA, and a combination of the DPD and the PA. The schematic diagram of the gain is used to represent a relationship between power of a signal to be processed and a gain (that is, a ratio of power of an output signal to power of the signal to be processed). The signal to be processed is an input signal of the DPD, and the output signal is an output signal of the PA.

Because the DPD processes a digital signal, and the PA processes an analog signal, a DAC and an ADC are usually further connected between the DPD and the PA. In addition, some filters and the like may be further connected between the DPD and the PA. For example, refer to FIG. 4. The DPD may be located in the digital baseband chip 301. It can be learned from FIG. 4 that the DAC, a first LPF, and the like are further connected between the DPD and the PA.

It should be noted that the connection relationship between the DPD and the PA described in FIG. 6 is merely used as an example to describe that before being sent, a signal first passes through the DPD and then passes through the PA. Therefore, descriptions of the connection relationship between the DPD and the PA in FIG. 6 and FIG. 4 are not contradictory.

It should be noted that, for complete description, the output signal of the PA is shown in the wireless communication apparatus provided in this application. This is described herein in a unified manner, and details are not described in the following again.

(3) TDD Scenario

Figure 7A:
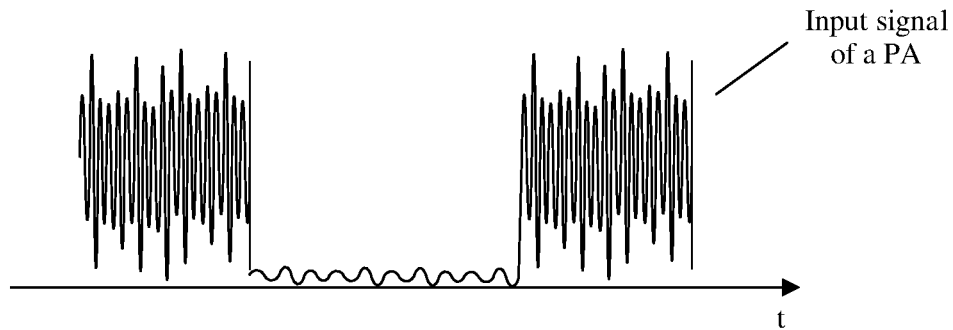
FIG. 7A is a waveform diagram of an input signal of a PA in a TDD scenario according to an embodiment of this application.

In the TDD scenario, a waveform of the input signal of the PA is shown in FIG. 7A. In FIG. 7A, a horizontal axis represents a time axis, represented as t, and a vertical axis represents a voltage value (or a power value) of a signal. Such an input signal causes the PA to have a feature of time-high and time-low In this case, the nonlinear feature of the PA usually varies with the input signal and operating environment. For example, when a signal in the PA is from not being transmitted to being transmitted, the PA is switched from an off state to an on state. An internal temperature of the PA undergoes a sharp change from low to high. As a result, a gain of the PA cannot be stable for a long time.

In the TDD scenario, the PA is frequently turned on and off. As a result, the nonlinear feature of the PA always changes rapidly. This feature is greatly different from a PA feature used during offline training of a DPD system. This change of the dynamic gain is referred to as a long-term memory effect in academia, which significantly deteriorates performance of the DPD system, and even causes a negative linearity gain in the DPD system. Currently, this is a very difficult problem on both a base station side and a terminal side.

Figure 7B:
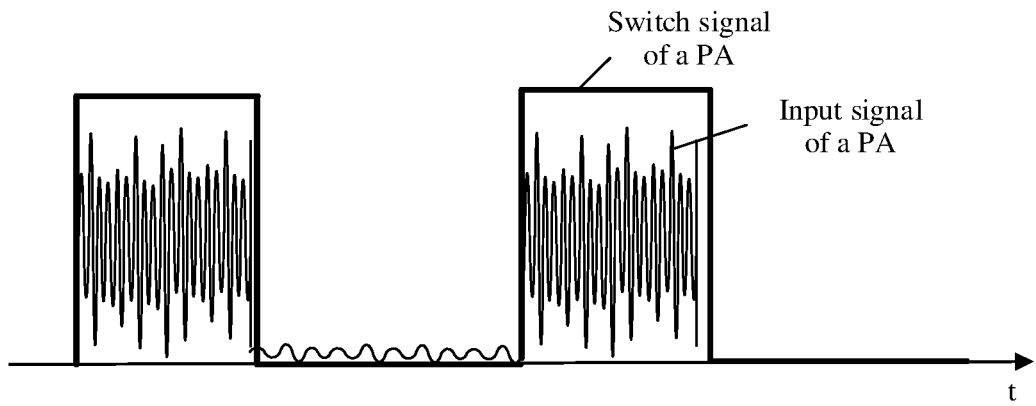
FIG. 7B is a schematic diagram of a relationship between an input signal of a PA and a switch signal of the PA in a TDD scenario according to an embodiment of this application.

In the TDD scenario, a waveform of a switch signal of the PA is a square wave. The input signal of the PA is determined based on the switch signal of the PA. A relationship between the input signal of the PA and the switch signal of the PA is shown in FIG. 7B. FIG. 7B is drawn based on FIG. 7A. In FIG. 7B, a horizontal axis is a time axis, represented as t, and a vertical axis represents a voltage value (or a power value) of a signal. A square wave signal shown by a thick line in FIG. 7B represents the switch signal of the PA.

(4) Bias Signal

In the current technology, in the TDD scenario, voltage of a bias signal is usually a constant value.

In this embodiment of this application, in the TDD scenario, the bias signal is determined based on the input signal (for example, the signal shown in FIG. 7A) of the PA. The bias signal is used to compensate for (or cancel) a feature that the PA changes with the input signal in the TDD scenario. Because there is a relationship similar to the relationship shown in FIG. 7B between the input signal of the PA and the switch signal of the PA, it may be considered that in this embodiment of this application, in the TDD scenario, the bias signal is determined based on the switch signal of the PA. The bias signal is used to compensate for (or cancel) a feature that the PA changes with the input signal in a TDD scenario, and is equivalent to that the bias signal is used to compensate for a nonlinear change of the PA.

For example, in this embodiment of this application, the bias signal is determined based on the input signal or the switch signal of the PA. Therefore, in this embodiment of this application, the bias signal may be referred to as a "dynamic bias signal".

For example, the feature that the PA changes with an input signal in the TDD scenario, or the nonlinear change of the PA in the TDD scenario may be referred to as a self-bias effect of the PA.

Figure 7C:
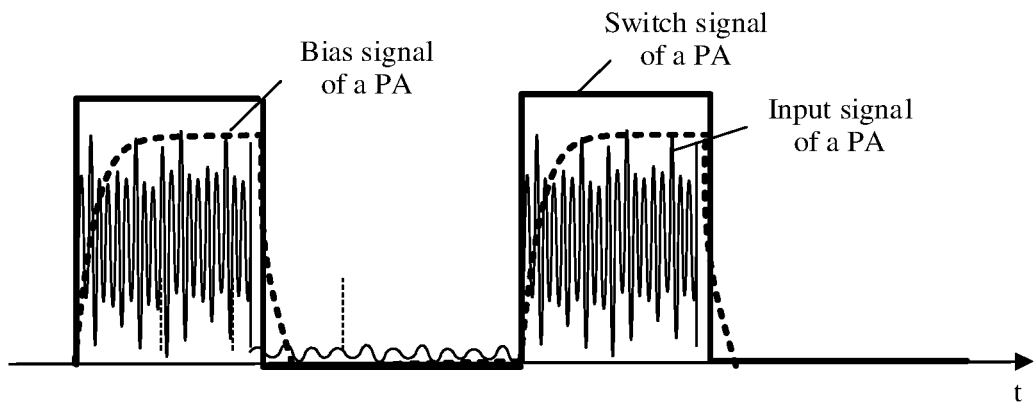
FIG. 7C is a schematic diagram of a relationship between an input signal, a switch signal, and a bias signal of a PA in a TDD scenario according to an embodiment of this application.

FIG. 7C is a schematic diagram of a relationship between the input signal and a bias signal of the PA according to an embodiment of this application. In FIG. 7C, a horizontal axis represents a time axis, and a vertical axis represents a voltage value (or a power value) of a signal. FIG. 7C is drawn based on FIG. 7B. A dashed line in FIG. 7C represents a bias signal of the PA according to an embodiment of this application.

A bias signal shown by a dashed line in FIG. 7C is merely an example. In addition, FIG. 7C merely schematically describes a general waveform of the bias signal applicable to this embodiment of this application, and constitutes no limitation on an actual waveform of the bias signal applicable to this embodiment of this application. In addition, for detailed descriptions of the bias signal, refer to the following.

This embodiment of this application provides a basic idea of "compensating, based on the bias signal of the PA, for the nonlinear change of the PA in the TDD scenario, or compensating, based on the bias signal of the PA, for the feature that the PA changes with the input signal in the TDD scenario". This is not limited to how to obtain an actual waveform of the bias signal. Optionally, an actual waveform of the bias signal of the PA may be obtained by performing a plurality of times of debugging based on a feature (for example, a hardware feature) of the PA in a design stage. For details, refer to the embodiment shown in FIG. 11B.

(5) Non-ET System and ET System

Figure 8:
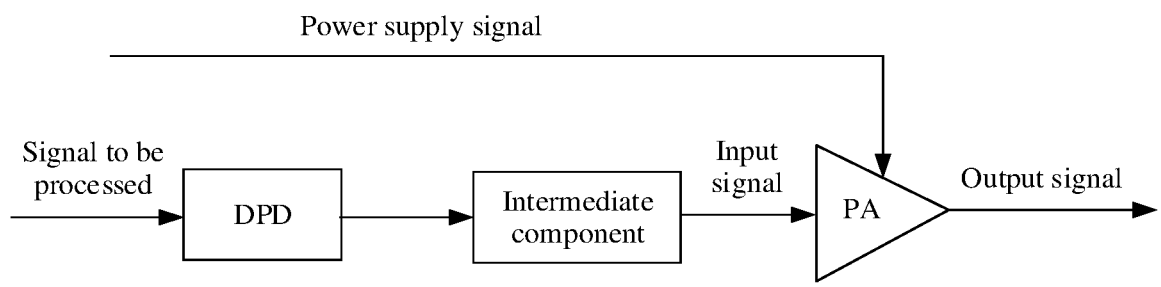
FIG. 8 is a schematic diagram of a structure of a DPD system in a non-ET system according to an embodiment of this application.

In the non-ET system, voltage of a power supply signal input to a power supply port of a PA is constant. FIG. 8 is a schematic diagram of a structure of a DPD system in the non-ET system. Voltage of a power supply signal in FIG. 8 is a constant value.

Figure 9:
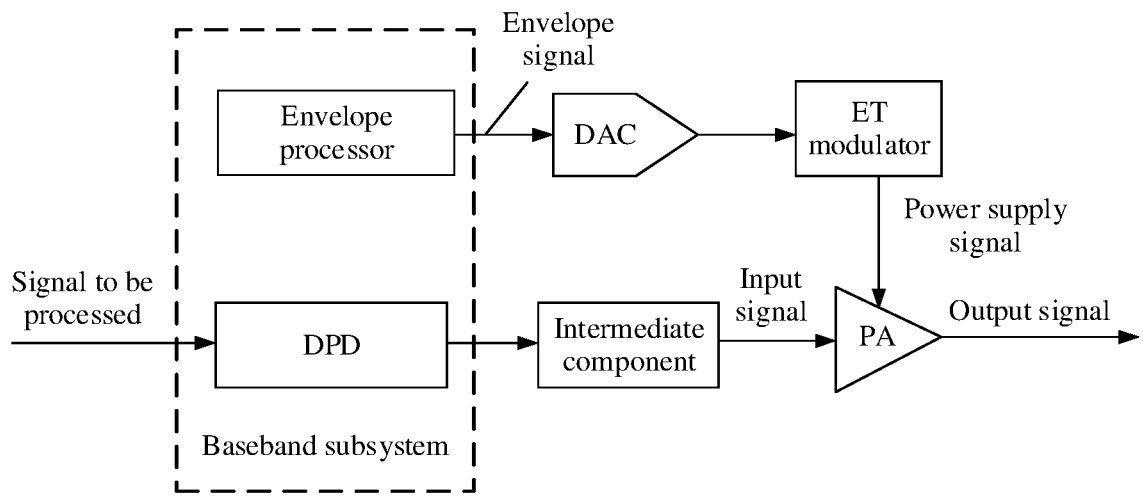
FIG. 9 is a schematic diagram of a structure of a DPD system in an ET system according to an embodiment of this application.

In the ET system, a power supply signal input to a power supply port of a PA is generated based on an envelope signal generated by an envelope processor. Specifically, digital-to-analog conversion is performed on the envelope signal by using a DAC. Then, an ET modulator modulates an analog signal obtained after digital-to-analog conversion, to obtain the power supply signal. FIG. 9 is a schematic diagram of a structure of a DPD system in the ET system.

For example, the envelope processor may be located in a baseband subsystem.

(6) Other Terms

In the specification and accompanying drawings of this application, the terms "first", "second", and the like are intended to distinguish between different objects or distinguish between different processing of a same object, but do not indicate a particular order of the objects. In addition, the terms "including", "having", or any other variant thereof in descriptions of this application are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. In embodiments of this application, "a plurality of" includes two or more. In embodiments of this application, the term such as "example" or "for example" is used to represent giving an example, an illustration, or descriptions. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner.

A port name of a component described in this embodiment of this application is merely an example, and may also be referred to as another name during specific implementation. For example, the bias port of the PA may also be referred to as an interface circuit.

In view of a problem in the conventional technology that "in the TDD scenario, performance of the DPD system is low, and even a negative linearity gain in the DPD system is caused", embodiments of this application provide a wireless communication apparatus. The wireless communication apparatus may be the wireless communication device 20 in FIG. 2. Alternatively, the wireless communication apparatus may be a communication subsystem (including the baseband subsystem 204, the radio frequency integrated circuit 205, and the radio frequency front-end component 206) in the wireless communication device 20. The communication subsystem described above may be implemented by using one or more chips.

A basic idea of the technical solutions provided in embodiments of this application is as follows: The bias signal of the DPD is used to compensate for (or cancel) a feature change of the PA in the TDD scenario, to help stabilize a feature of the PA in the TDD scenario, and further help improve linear performance of the DPD system. In some embodiments, an existing signal (for example, a TDD timing signal or an envelope signal of the ET system) in the wireless communication apparatus is processed to obtain the bias signal of the DPD. In this way, hardware resource overheads are reduced, and implementation complexity and costs of signal processing are reduced.

The following describes a wireless communication apparatus 4 provided in embodiments of this application with reference to the accompanying drawings.

Figure 10A:
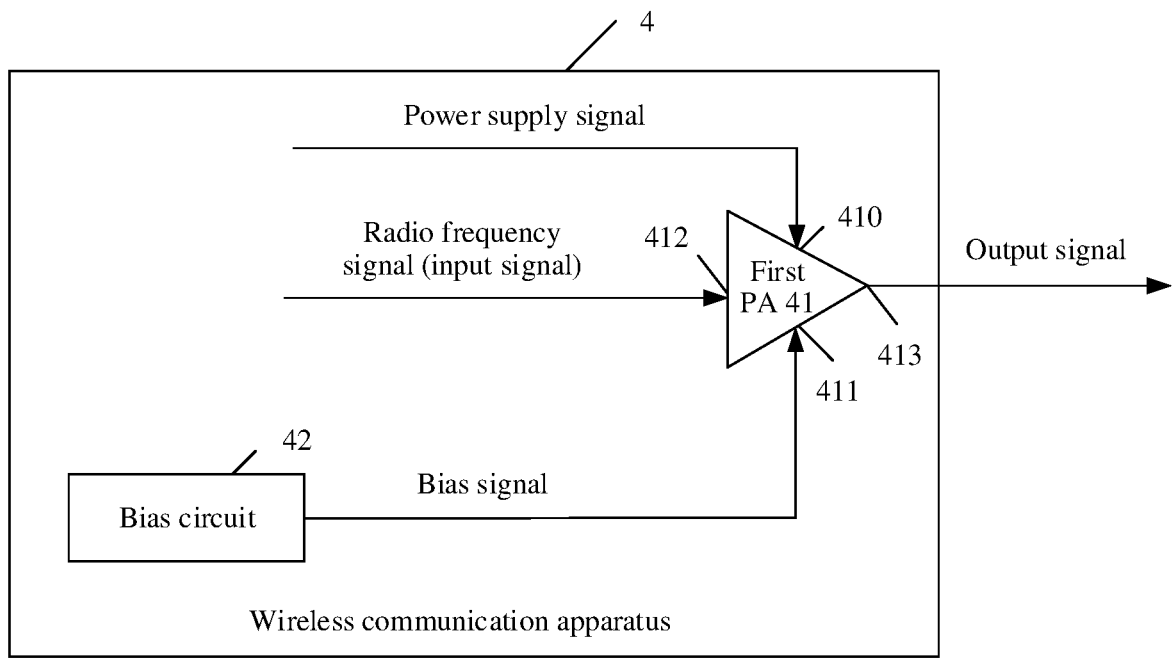
FIG. 10A is a schematic diagram 1 of a structure of a wireless communication apparatus according to an embodiment of this application.

FIG. 10A is a schematic diagram of a structure of a wireless communication apparatus 4 according to an embodiment of this application. The wireless communication apparatus 4 shown in FIG. 10A includes a first PA 41 and a bias circuit 42.

The first PA 41 includes a power supply port 410, a bias port 411, a signal input port 412, and a signal output port 413. The first PA 41 is configured to: receive a power supply signal through the power supply port 410, receive a bias signal through the bias port 411, receive a radio frequency signal through the signal input port 412, and output a radio frequency signal obtained after power amplification through the signal output port 413.

The bias circuit 42 is connected to the bias port 411, and is configured to generate the foregoing bias signal. A timing feature of the bias signal is synchronized with a timing feature of a switch signal of the first PA 41, to compensate for a nonlinear change of the first PA 41.

The switch signal of the first PA 41 is used to control timing of switching on or off the first PA 41 in a TDD scenario. The switch signal of the first PA 41 is a square wave signal. For example, the bias signal may be considered as a smooth signal obtained by fitting the square wave signal.

The timing feature of the switch signal may include a change trend of the switch signal with time. Optionally, the timing feature of the switch signal may further include a time point at which a change starts. The change trend of the switch signal with time includes: a rising stage, a steady stage, a falling stage, and a switch-off stage. The rising stage refers to a stage from a low level to a high level. The steady stage refers to a stage in which the high level persists. The falling stage refers to a stage from the high level to the low level. The switch-off stage refers to a stage in which the low level persists. Optionally, the change trend of the switch signal with time is periodically changing according to "the rising stage, the steady stage, the falling stage, and the switch-off stage".

Optionally, that the timing feature of the bias signal of the first PA 41 is synchronized with the timing feature of the switch signal of the first PA 41 includes: a change trend of the bias signal of the first PA 41 is the same as that of the switch signal of the first PA 41. Based on the foregoing description, it can be learned that the change trend of the bias signal with time includes a rising stage, a steady stage, a falling stage, and a switch-off stage. Optionally, the change trend of the bias signal with time is periodically changing according to "the rising stage, the steady stage, the falling stage, and the switch-off stage".

Further optionally, that the timing feature of the bias signal of the first PA 41 is synchronized with the timing feature of the switch signal of the first PA 41 may further include: A start time point of the rising stage of the bias signal of the first PA 41 is the same as a start time point of the rising stage of the switch signal of the first PA 41. Alternatively, a difference between the start time point of the rising stage of the bias signal and the start time point of the rising stage of the switch signal of the first PA 41 falls within a first preset range.

Further optionally, that the timing feature of the bias signal of the first PA 41 is synchronized with the timing feature of the switch signal of the first PA 41 may further include: A start time point of the falling stage of the bias signal is the same as a start time point of the falling stage of the switch signal of the first PA 41. Alternatively, a difference between the start time point of the falling stage of the bias signal and the start time point of the falling stage of the switch signal of the first PA 41 falls within a second preset range. The first preset range and the second preset range may be the same or different.

Figure 10B:
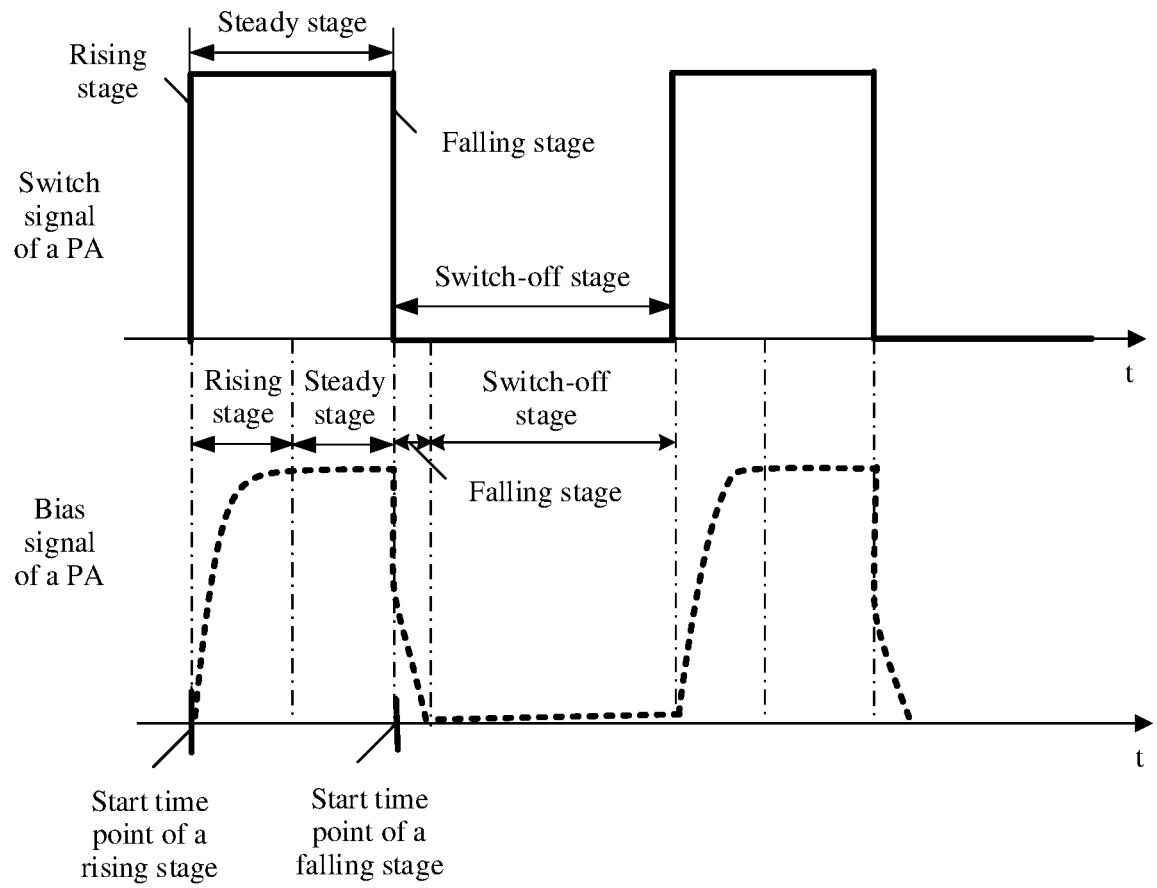
FIG. 10B is a schematic diagram in which a timing feature of a bias signal of a PA is synchronized with a timing feature of a switch signal of the PA according to an embodiment of this application.

FIG. 10B is a schematic diagram in which a timing feature of a bias signal of a PA is synchronized with a timing feature of a switch signal of the PA according to an embodiment of this application.

It should be noted that, for the switch signal, a rising stage is specifically a stage of jumping from a low level to a high level, and a falling stage is specifically jumping from the high level to the low level. For the bias signal, the rising stage is specifically a stage in which the low level smoothly rises to the high level. The stage may be referred to as a "ramping stage". The falling stage is specifically a stage in which the high level smoothly falls to the low level.

In addition, it should be noted that the timing feature of the bias signal is synchronized with the timing feature of the switch signal. During actual implementation, "synchronization" herein may be replaced with fitting, matching, equivalent, or the like.

According to the technical solution provided in this embodiment of this application, in the TDD scenario, the timing feature of the bias signal of the PA is synchronized with the timing feature of the switch signal of the PA. Because an input signal of the switch signal of the PA in the TDD scenario is sometimes high and sometimes low, the bias signal of the PA is sometimes high and sometimes low. In other words, voltage of the bias signal of the PA is not a constant value. Therefore, compared with the conventional technology, the technical solution provided in this embodiment of this application changes a waveform of a bias signal. Further, because the bias signal affects a transmission feature of the PA, changing a value of the voltage of the bias signal helps change the transmission feature of the PA. This helps stabilize the feature of the PA in the TDD scenario (that is, a degree of a nonlinear change is reduced, and a degree of change with a change of an input signal of the PA is reduced), and helps improve linear performance of the DPD system (including the DPD and the PA).

Figure 10C:
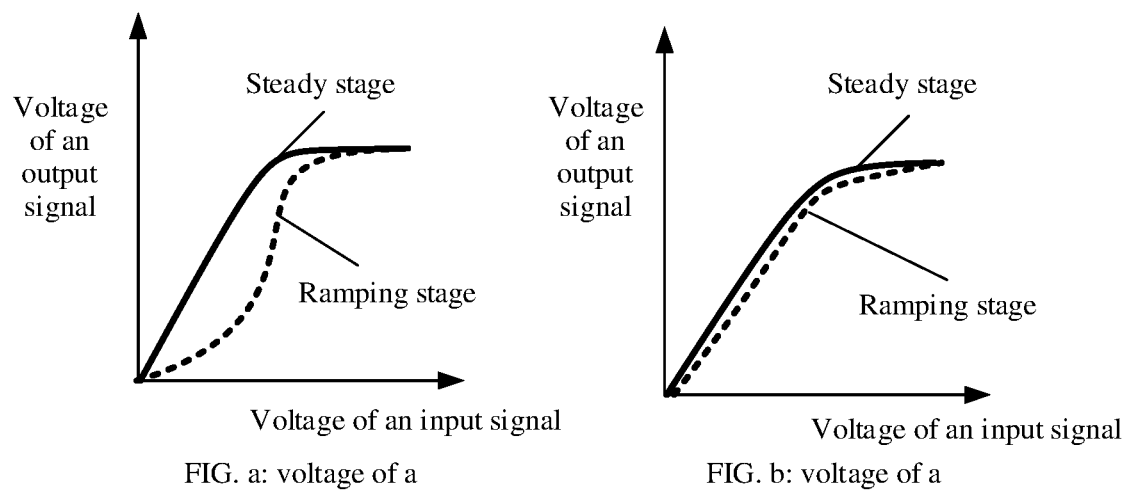
FIG. 10C is a schematic diagram used to describe that a bias signal affects a transmission feature of a PA according to an embodiment of this application.

FIG. 10C is a schematic diagram used to describe that the bias signal affects the transmission feature of the PA according to an embodiment of this application. FIG. 10C is drawn based on the bias signal shown in FIG. 10B. In each diagram in FIG. 10C, a horizontal coordinate represents a voltage value of an input signal of the PA, and a vertical coordinate represents a voltage of an output signal of the PA. The following describes FIG. a and FIG. b in FIG. 10C.

FIG. a shows a signal transmission feature (as shown by a solid line in FIG. a) of the PA in the steady stage and a signal transmission feature (as shown by a dashed line in FIG. a) of the PA in the ramping stage in the TDD scenario when the voltage of the bias signal is a constant value 2.4 V.

FIG. b shows the signal transmission feature (shown by a solid line in the FIG. b) of the PA in a steady stage and a signal transmission feature (shown by a dashed line in the FIG. b) of the PA in a ramping stage in the TDD scenario when the voltage of the bias signal is not a constant value (for example, may be the bias signal shown in FIG. 10B, and is represented as 2.4+d(n) in FIG. b, to indicate that the voltage value of the bias signal changes with time).

It can be learned by comparing FIG. a with FIG. b that using the bias signal provided in this embodiment of this application helps change the transmission feature of the PA. Further, compared with FIG. a, a signal transmission feature in the ramping stage in FIG. b is closer to the signal transmission feature in the steady stage. Therefore, power amplification performed by the PA based on the bias signal provided in this embodiment of this application helps stabilize a feature of the PA in a TDD scenario. This helps improve linear performance of the DPD system.

The following describes a specific implementation of the wireless communication apparatus. Before this, it should be noted that, for brevity of the accompanying drawings, power supply ports are not shown in some accompanying drawings of this application, for example, FIG. 11A, FIG. 11B, and FIG. 12A. However, during actual implementation, the PA has a power supply port.

Figure 11A:
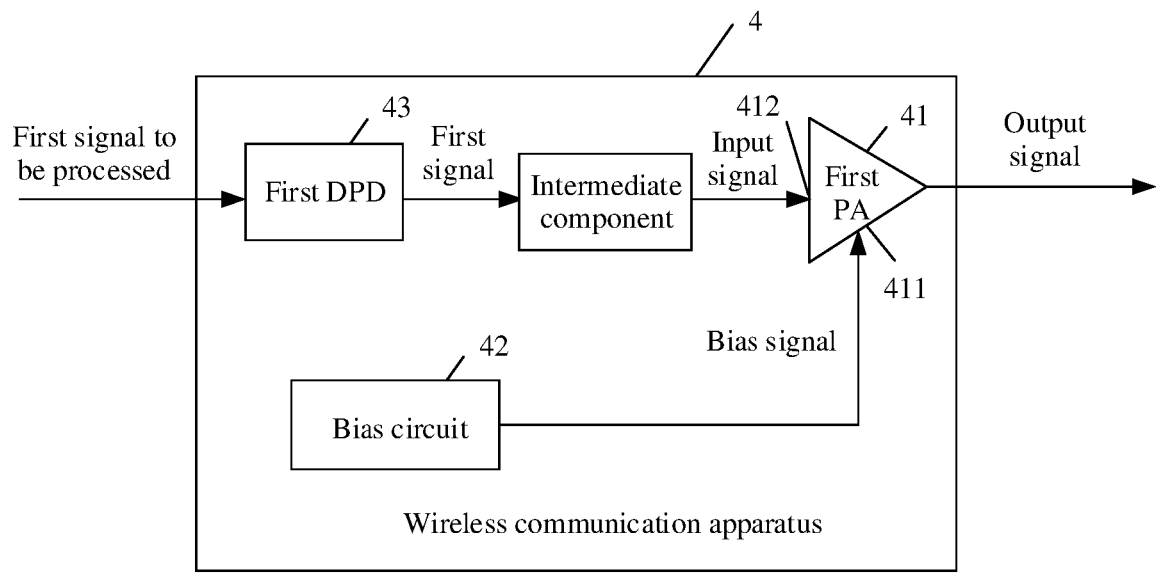
FIG. 11A is a schematic diagram 2 of a structure of a wireless communication apparatus according to an embodiment of this application.

Optionally, as shown in FIG. 11A, the wireless communication apparatus 4 may further include a first DPD 43. The first DPD 43 is configured to perform predistortion processing on a first signal to be processed to obtain a first signal, to compensate for a distortion feature of the first PA 41. An input signal of the first PA 41 is generated based on the first signal.

Ideally, a linear gain can be ensured after the predistortion processing of the first DPD 43 and the amplification processing of the first PA 41 are performed on the first signal to be processed. During actual implementation, refer to FIG. 4. It can be learned that components such as a DAC and a filter (such as an LPF) may be further disposed between the first DPD 43 and the first PA 41. For brevity of description, in this embodiment of this application, the components between the DPD and the PA are collectively referred to as intermediate components.

Figure 11B:
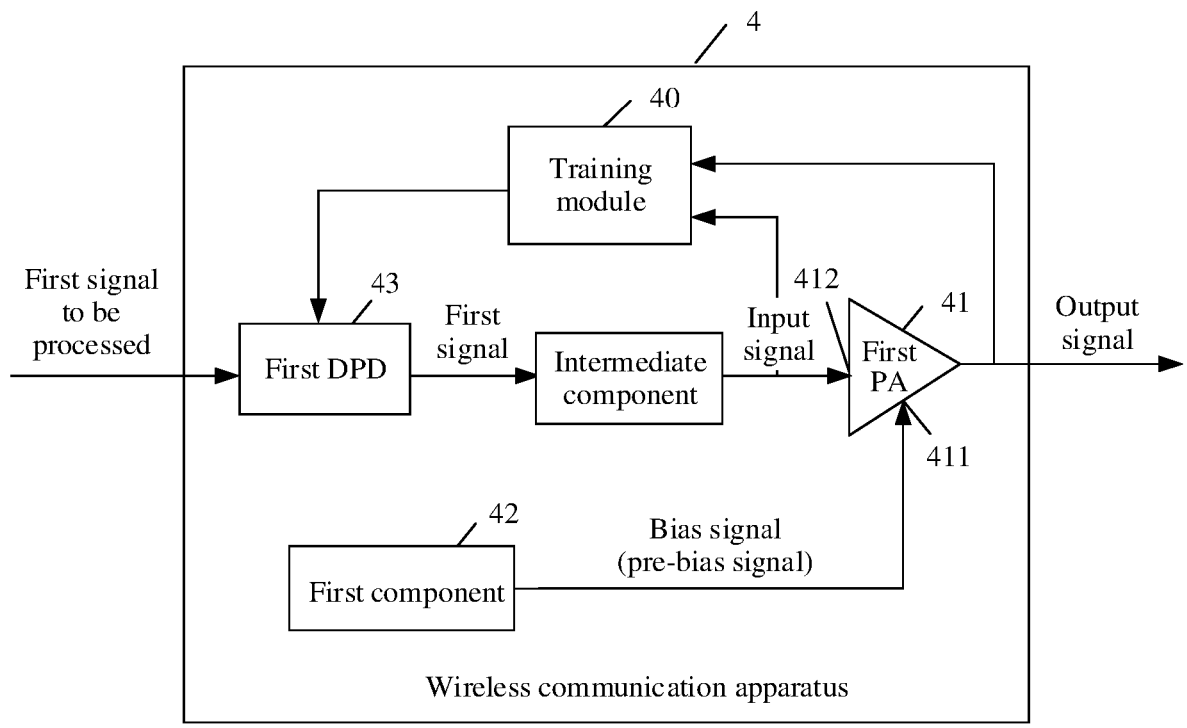
FIG. 11B is a schematic diagram 3 of a structure of a wireless communication apparatus according to an embodiment of this application.

The bias signal in the embodiment described in FIG. 11A is a bias signal that can compensate for a feature that the first PA 41 changes with an input signal in the TDD scenario. As shown in FIG. 11B, a wireless communication apparatus 4 is provided. Based on FIG. 11A, a training module 40 is added to the wireless communication apparatus 4, to obtain a parameter (which may be specifically a parameter of an analog shaping unit or a digital shaping unit below) of the bias circuit 42 when the bias signal is generated, and a model coefficient used by the first DPD 43 when the bias signal is generated.

As shown in FIG. 11B, a signal input port of the training unit 40 is connected to the signal input port 412 and the signal output port of the first PA 42. A signal output port of the training unit 40 is connected to the first DPD 43.

Based on this, the bias circuit 42 is further configured to adjust a parameter of the bias circuit 42 to generate a pre-bias signal. The bias signal is a pre-bias signal that meets compensating for the feature that the first PA 41 changes with the input signal in the TDD scenario. The pre-bias signal is used to adjust a relationship between the output signal and the input signal of the first PA 41. In other words, the pre-bias signal is a signal generated by the bias circuit 42 in a training process (or in other words, the pre-bias signal is a bias signal in a training process). In a training process of the training unit 40, the pre-bias signal may not meet a condition of "compensating for the feature that the first PA 41 changes with the input signal in the TDD scenario".

The training unit 40 is configured to perform training based on the output signal and the input signal of the first PA 41, to obtain the model coefficient of the first DPD. The model coefficient enables the feature of the first DPD 43 to meet an inverse function of a feature that the output signal of the first PA 41 changes with the input signal in the TDD scenario. Optionally, the training unit is specifically configured to perform training based on the output signal and the input signal of the first PA 41 and a model extraction algorithm, to obtain the model coefficient of the first DPD 43. For example, the model extraction algorithm includes a least square (LS) method or a least mean square error (LMS) algorithm. For example, the training unit 40 may be located in the digital baseband chip 301.

Based on FIG. 11B, the first DPD is specifically configured to perform predistortion processing on the first signal to be processed based on the foregoing model coefficient. The bias circuit is 42 specifically configured to generate the bias signal based on a target parameter. The target parameter is a parameter of the bias circuit when the training unit obtains model coefficient.

In the wireless communication apparatus 4 shown in FIG. 11B, a parameter of the bias circuit 42 is continuously adjusted, so that the signal transmission feature of the first PA 41 changes. The training unit 40 is connected to the signal input port and the signal output port of the first PA 41, to track a signal transmission feature change of the first PA 41 caused by adjusting the parameter of the bias circuit 42. Then, the training unit 40 obtains the model coefficient of the first DPD 43 through training based on the change and a predefined model extraction algorithm. The model coefficient enables the feature of the first DPD to meet an inverse function of a feature that the output signal of the first PA 41 changes with the input signal in the TDD scenario. In other words, the model coefficient enables the signal change feature of the signal to be processed after the signal is processed by the first DPD 43 and the first PA 41 in the TDD scenario, to meet (or meet within an allowed error range) a signal change feature of the signal to be processed shown in FIG. 6 after being processed by the DPD and the PA. Therefore, whether the model coefficient obtained by the training unit 40 can enable the feature of the first DPD 43 to meet that "the inverse function of the feature of the output signal of the first PA 41 changing with the input signal in the TDD scenario" may be determined with reference to the signal change feature of the signal to be processed after being processed by the DPD and the PA shown in FIG. 6

It should be noted that, before the training and after the training process is completed, an adjacent channel leakage ratio (ACLR) of the PA signal output port decreases significantly.

The following describes a specific implementation of the bias circuit 42.

Manner 1: The bias circuit 42 is specifically configured to generate the bias signal based on a TDD timing signal. The bias circuit 42 provided in manner 1 may be used in an ET system, or may be used in a non-ET system.

Figure 12A:
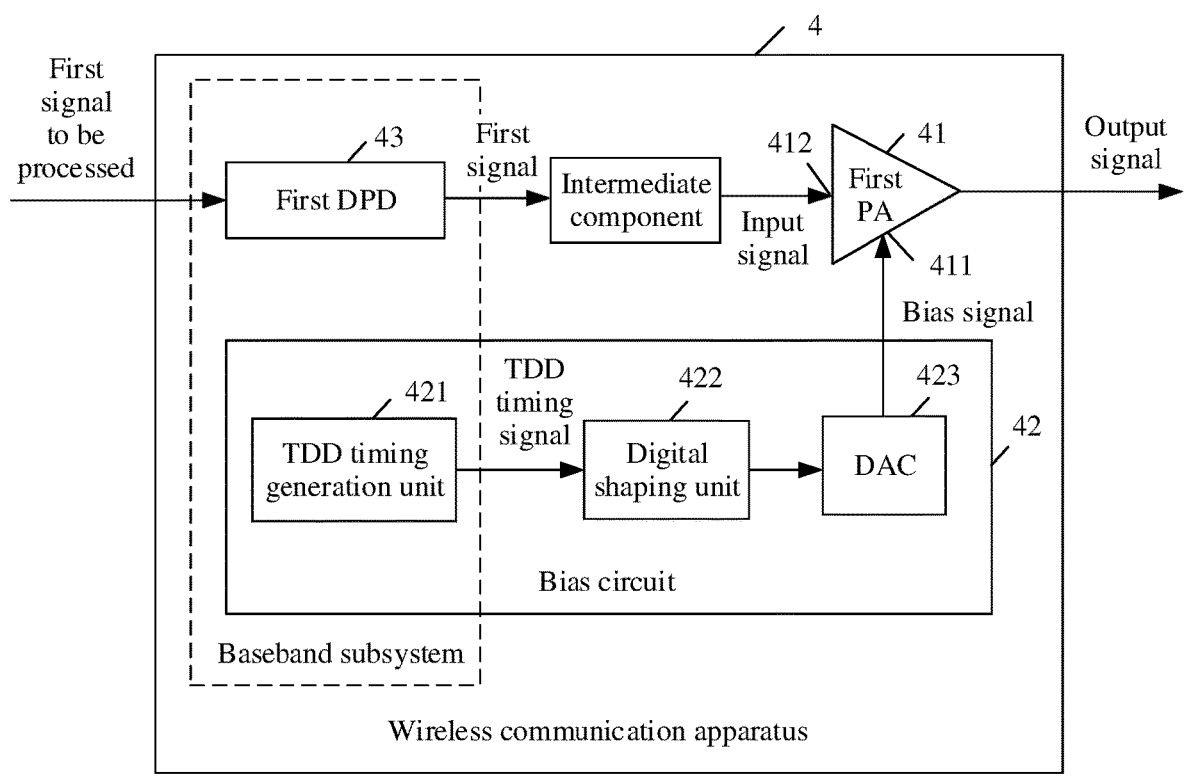
FIG. 12A is a schematic diagram 4 of a structure of a wireless communication apparatus according to an embodiment of this application.

In an implementation, FIG. 12A is a schematic diagram of a structure of a wireless communication apparatus 4 according to an embodiment of this application. A bias circuit 42 in the wireless communication apparatus 4 includes the following.

A TDD timing generation unit 421 is configured to generate a TDD timing signal. The TDD timing signal is used to control timing of switching on or off a TDD system.

A digital shaping unit 422 is configured to shape the TDD timing signal. Optionally, the digital shaping unit 422 may be a filter, for example, an RC filter or a CR filter, or a finite impulse response (FIR) filter or an infinite impulse response (IIR) filter.

A DAC 423 is configured to perform digital-to-analog conversion on a shaped TDD timing signal to obtain the bias signal.

Figure 12B:
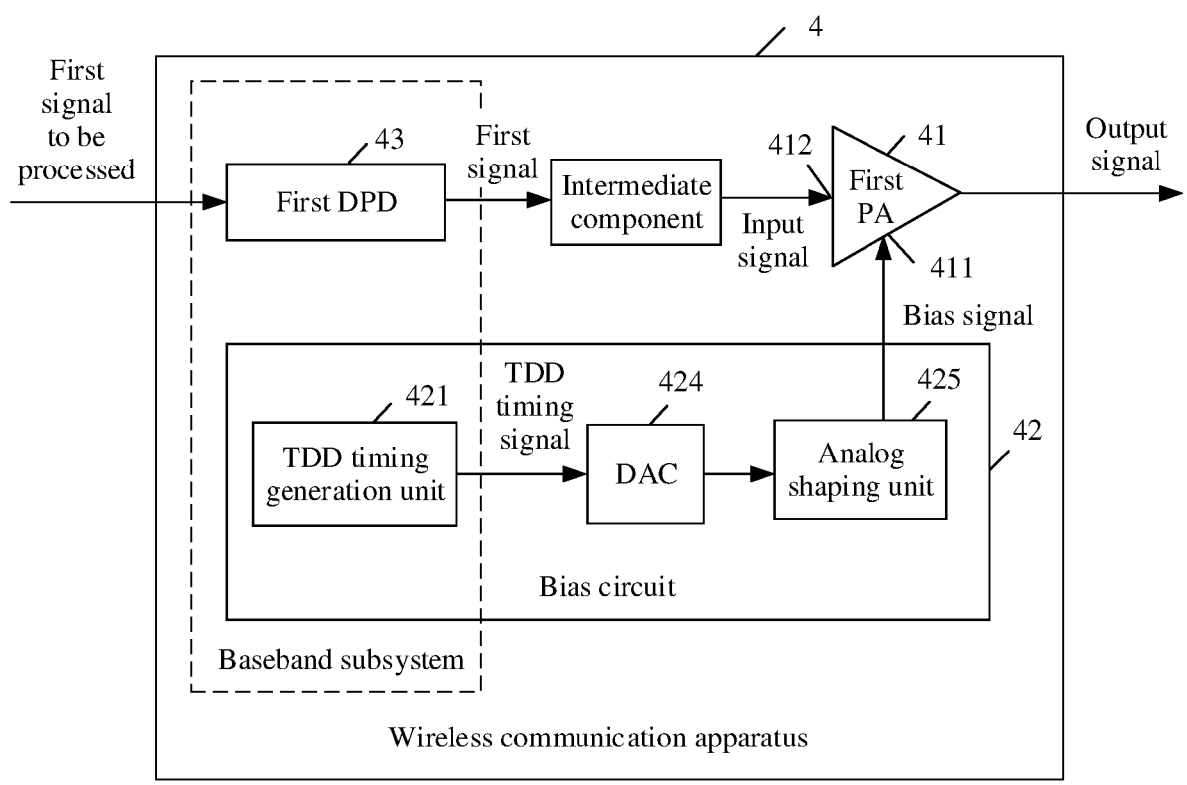
FIG. 12B is a schematic diagram 5 of a structure of a wireless communication apparatus according to an embodiment of this application.

In another implementation, FIG. 12B is a schematic diagram of a structure of another wireless communication apparatus 4 according to an embodiment of this application. A bias circuit 42 in the wireless communication apparatus 4 includes the following.

The TDD timing generation unit 421 is configured to generate a TDD timing signal. The TDD timing signal is used to control timing of switching on or off the first PA 41 in the TDD scenario or a timing of switching on or off the TDD system.

A DAC 424 is configured to perform digital-to-analog conversion on the TDD timing signal to obtain an analog signal.

An analog shaping unit 425 is configured to shape the analog signal to obtain a bias signal.

In the TDD scenario, to achieve switch control on a radio frequency front-end component, a processor (such as a DSP or an ASIC) in a baseband subsystem usually generates a corresponding TDD timing signal. The TDD timing signal is generally a digital step waveform. The digital step waveform usually reflects a change of average power of a transmit signal. Therefore, a DPD bias signal (the bias signal shown in FIG. 7C) may be generated by performing shaping and digital-to-analog conversion on the TDD timing signal. The "shaping" herein may be shaping of a digital signal, or may be shaping of an analog signal.

A component/module in the bias circuit 42 may be implemented by using software, or may be implemented by using hardware, or may be implemented by using software in combination with hardware. This is not limited in this application. For example, the TDD timing generation unit 421 may be implemented by using hardware in a processor in a baseband subsystem, or by running a software program in a processor in the baseband subsystem.

In manner 1, the TDD timing generation unit may be implemented by using a module/component for generating the TDD timing signal in the conventional technology. In other words, in this technical solution, an existing TDD timing signal in the conventional technology is processed, to generate the bias signal, and no dedicated module/component is required to generate the bias signal. This helps save hardware overhead, and helps reduce implementation complexity and costs of signal processing. In addition, implementation complexity and costs of digital signal processing such as the DPD do not need to be increased.

Manner 2: The bias circuit 42 generates the bias signal based on an envelope signal of an ET system. The bias circuit 42 provided in manner 2 may be used in the ET system.

Refer to FIG. 9. It can be learned that in the ET system, the wireless communication device further includes an envelope processor, a DAC, and an ET modulator. The envelope processor is configured to generate the envelope signal of the ET system. The DAC is configured to perform digital-to-analog conversion on the envelope signal to obtain an analog signal. The ET modulator is configured to modulate the analog signal to obtain a power supply signal. The power supply signal is input to a power supply port of the PA.

Figure 13A:
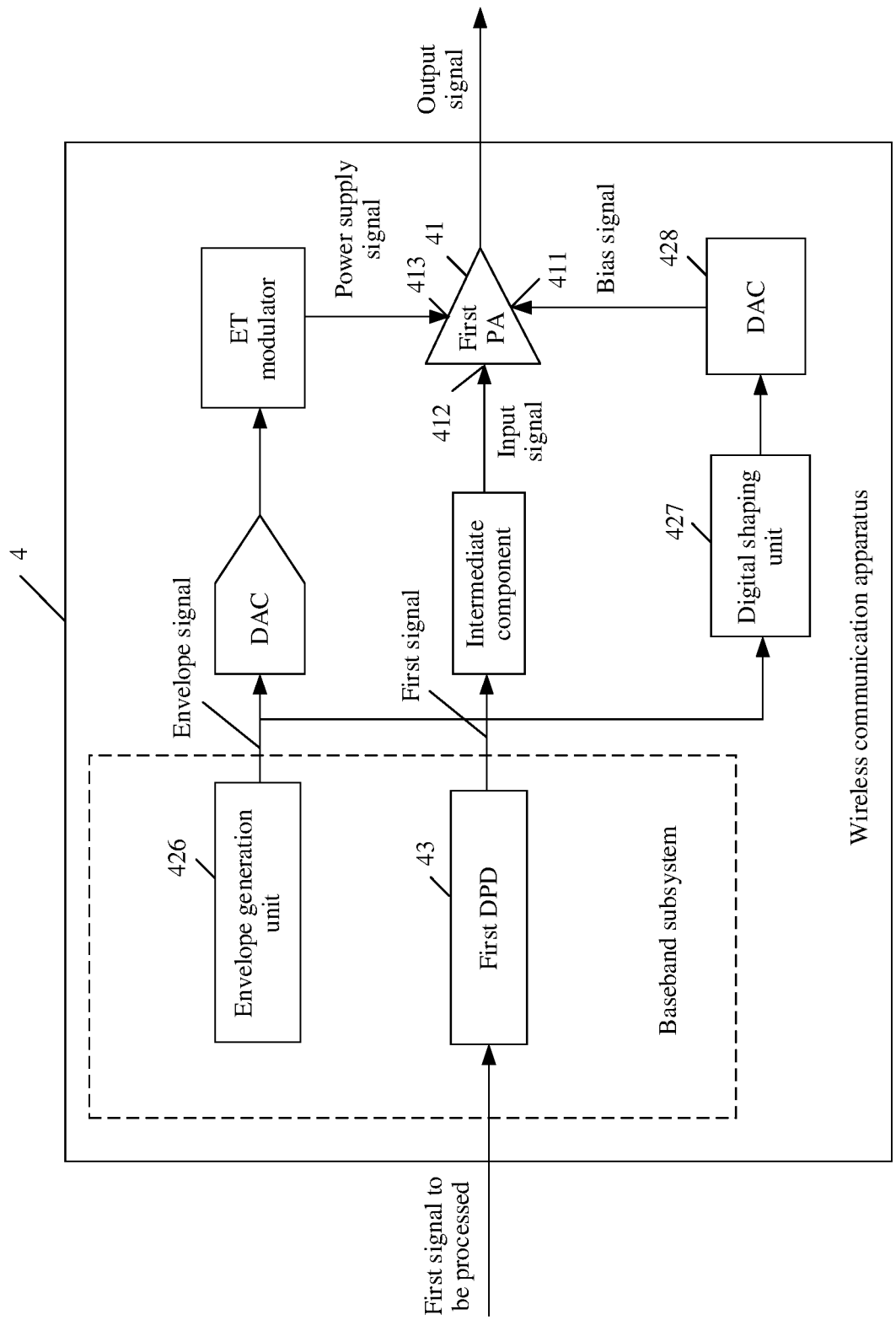
FIG. 13A is a schematic diagram 6 of a structure of a wireless communication apparatus according to an embodiment of this application.

In an implementation, FIG. 13A is a schematic diagram of a structure of a wireless communication apparatus 4 according to an embodiment of this application. A bias circuit 42 in the wireless communication apparatus 4 includes the following.

An envelope generation unit 426 is configured to generate an envelope signal of an ET system.

A digital shaping unit 427 is configured to shape the envelope signal.

A DAC 428 is configured to perform digital-to-analog conversion on a shaped envelope signal to obtain a bias signal.

In the ET system, a digital circuit part (such as a baseband/digital intermediate frequency) generally includes a corresponding envelope generation unit to complete generation of the envelope signal of the ET system. For example, refer to FIG. 9. The envelope generation unit 426 may be specifically implemented by using an envelope processor in a baseband subsystem. The envelope signal usually reflects a change of average power of the transmit signal. Therefore, processing such as shaping (for example, filtering/smoothing) may be performed on the envelope signal, for example, low-order IIR filtering. Digital-to-analog conversion is performed to generate the bias signal (for example, the bias signal shown in FIG. 7C).

In this implementation, the envelope generation unit may be implemented by using a module/component (for example, the envelope processor in FIG. 9) for generating the envelope signal of the ET system in the conventional technology. In other words, in this technical solution, an envelope signal of an existing ET system in the conventional technology is processed, to generate the bias signal, and no dedicated module/component is required to generate the envelope signal of the ET system. This helps save hardware overhead, and helps reduce implementation complexity and costs of signal processing.

Figure 13B:
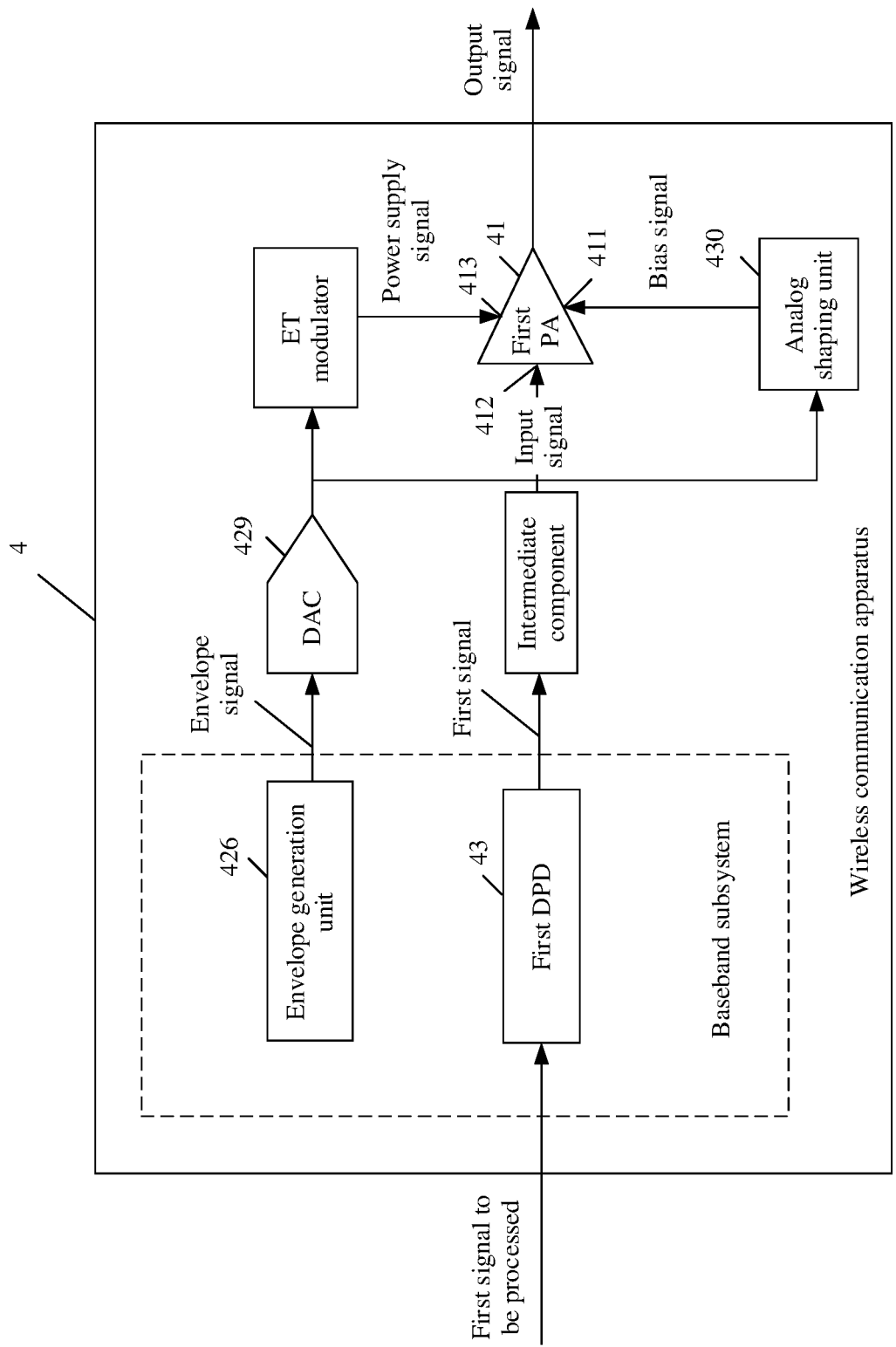
FIG. 13B is a schematic diagram 7 of a structure of a wireless communication apparatus according to an embodiment of this application.

In another implementation, FIG. 13B is a schematic diagram of a structure of a wireless communication apparatus 4 according to an embodiment of this application. A bias circuit 42 in the wireless communication apparatus 4 includes the following.

An envelope generation unit 426 is configured to generate an envelope signal of an ET system.

A DAC 429 is configured to perform digital-to-analog conversion on the envelope signal to obtain an analog signal of the envelope signal.

An analog shaping unit 430 is configured to shape the analog signal to obtain a bias signal.

In this implementation, the analog signal of the envelope generation unit may be implemented by using a module/component (for example, the envelope processor and a DAC in FIG. 9) for generating an envelope signal of an ET system in the conventional technology. In other words, in this technical solution, an analog signal of an envelope signal of an existing ET system in the conventional technology is processed, to generate the bias signal, and no dedicated module/component is required to generate the envelope signal of the ET system. This helps save hardware overhead, and helps reduce implementation complexity and costs of signal processing. In addition, implementation complexity and costs of digital signal processing such as the DPD do not need to be increased.

It should be noted that the digital shaping unit in any one of the foregoing implementations may be located in a digital circuit part in the wireless communication apparatus, for example, the baseband subsystem in FIG. 2. The DAC may be located in the digital circuit part (for example, a radio frequency subsystem in FIG. 2) or an analog circuit part in the wireless communication apparatus. The analog shaping unit may be located in the analog circuit part of the wireless communication apparatus.

It should be noted that, for brevity, the bias circuit 42 is not shown in FIG. 13A and FIG. 13B. In addition, in FIG. 13A, the DAC and the ET modulator that are configured to generate the power supply signal are used as components in the wireless communication apparatus 4. In FIG. 13B, the ET modulator that is configured to generate the power supply signal is used as a component in the wireless communication apparatus 4. During actual implementation, this embodiment of this application is not limited thereto. For example, the wireless communication apparatus 4 may not include these components.

It should be noted that shaping in a process of shaping the envelope signal to obtain the power supply signal of the PA is small-scale shaping. However, in a process of shaping the envelope signal to obtain the bias signal of the PA, large-scale shaping is performed.

Manner 3: The bias circuit 42 is specifically configured to generate the bias signal based on a switch signal of the first PA. The bias circuit 42 provided in manner 1 may be used in the ET system, or may be used in the non-ET system. Specifically, the bias circuit 42 may include a switch signal generation unit and the like.

A timing of switching on or off the first PA 41 may be the same as or different from a timing of switching on or off the TDD system. For example, it may be considered that the input signal of the first PA 41 is synchronized with the TDD timing signal. Therefore, for a module/component used to generate the bias signal based on the switch signal of the first PA 41, refer to manner 1. Certainly, a specific implementation is not limited thereto.

It should be noted that the TDD timing generation unit, the envelope signal generation unit, and the switch signal generation unit may correspond to (or be equivalent to) the foregoing signal obtaining circuit. The analog shaping unit and the digital shaping unit may correspond to (or be equivalent to) the foregoing smooth filter circuit.

The following describes a specific implementation of the bias circuit when the wireless communication apparatus includes a plurality of PAs. Specifically, an example in which the application is applied to a MIMO scenario is used for description, and certainly, the present invention is not limited thereto.

In a current communication system, especially a mobile communication system, a multiple-input multiple-output (MIMO) technology is generally used to increase a system capacity or a coverage area. In a MIMO scenario, a wireless communication device includes a plurality of sending channels, and each sending channel generally includes a DPD and a PA. The following describes the technical solutions that are provided in this embodiment of this application and that are applied to a MIMO scenario.

In an implementation, in the MIMO scenario, an independent bias signal generation circuit is designed for a PA of each sending channel in the wireless communication device. In this way, the bias signal of each sending channel can be independently controlled.

Figure 14:
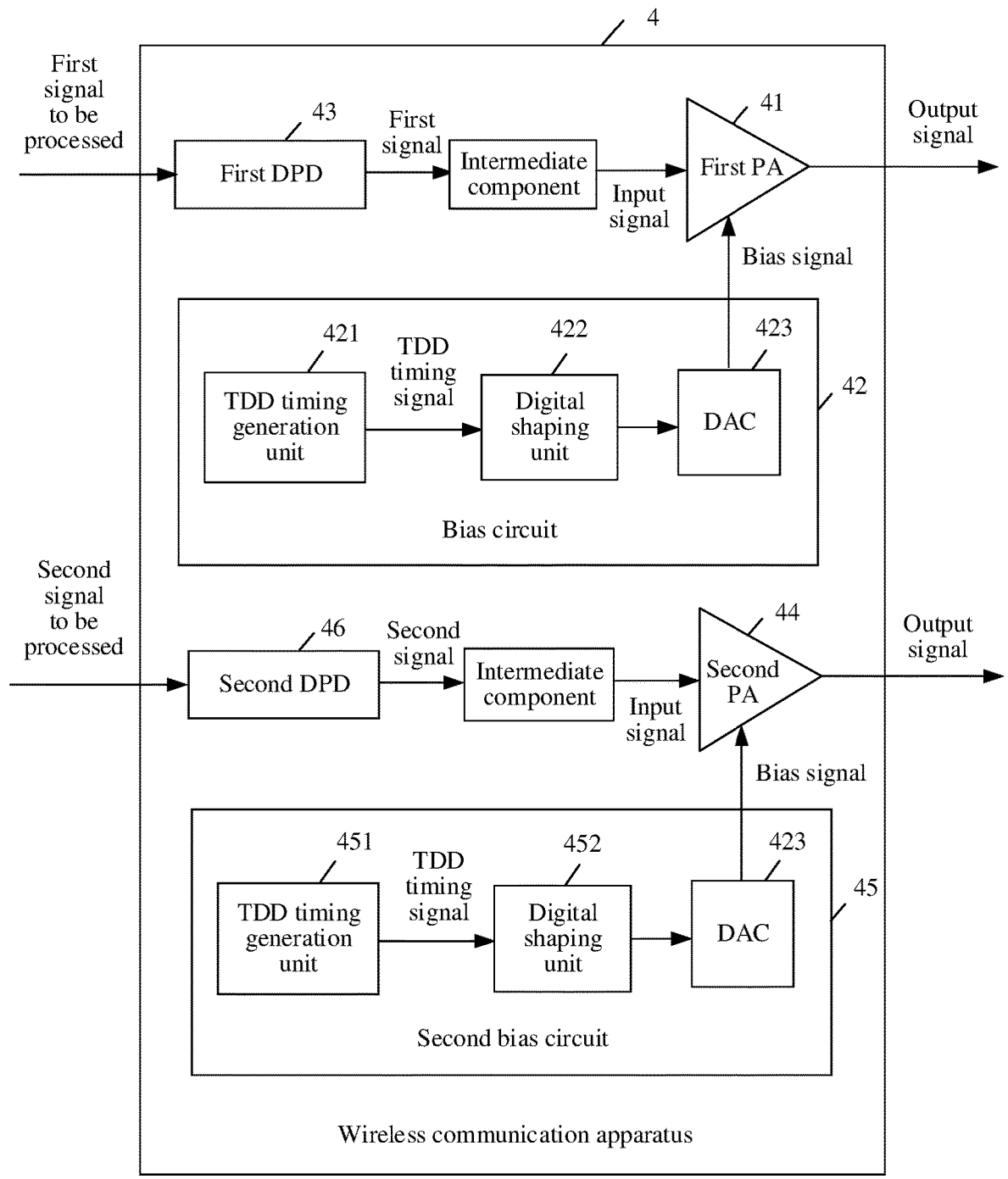
FIG. 14 is a schematic diagram 1 of a structure of a wireless communication apparatus used in a MIMO scenario according to an embodiment of this application.

FIG. 14 is a schematic diagram of a structure of a wireless communication apparatus 4 used in a MIMO scenario according to the foregoing manner 1. The wireless communication apparatus 4 includes a first sending channel and a second sending channel. The first sending channel includes the components/modules shown in FIG. 12A. The second sending channel includes a second DPD 46, a second PA 44, and a second bias circuit 45. The second bias circuit 45 includes a TDD timing generation unit 451, a digital shaping unit 452, and a DAC 453. For a connection relationship between these components, refer to FIG. 14. The second DPD 46 is configured to process a second processed signal to obtain a second signal. An input signal is obtained after the second signal is processed by an intermediate device. The input signal is sent to a signal input port of the second PA 44. The TDD timing generation signal 451 in the second bias circuit 45 is configured to generate a TDD timing signal, and send the TDD timing signal to the digital shaping unit 452 for shaping. The DAC 453 performs digital-to-analog conversion on a signal obtained after shaping, to obtain a bias signal. The bias signal is sent to a bias port of the second PA. The second PA 44 is configured to amplify, under control of the bias signal, the input signal to obtain an output signal. Optionally, a first processed signal and the second processed signal may be the same or may be different.

It should be noted that, when the another implementation of the foregoing manner 1 and the two implementations of the foregoing manner 2 are applied to the MIMO scenario, each sending channel may independently generate a configuration signal, to implement independent control on a bias signal of each sending channel. This is not described herein.

In another implementation, in the MIMO scenario, PAs of at least two sending channels in the wireless communication device may share one bias signal. In this way, compared with independently designing one bias signal for each sending channel, this helps reduce hardware resource overheads, reduce hardware implementation costs, and reduce a hardware volume. The technical solution may be particularly applicable to a device that has a relatively strict requirement on costs and a volume, for example, a mobile terminal or a customer premise device (CPE).

Based on the foregoing manner 1, currently, regardless of the base station or the terminal device, a MIMO transmit weighting manner of the base station or the terminal device is usually digital beam forming. In this manner, although transmit signals (corresponding to the first processed signal and the second processed signal) of different sending channels may be different, TDD timing signals of the sending channels are generally consistent. This means that in a case in which the bias signal is generated based on the foregoing manner 1, different sending channels can share one bias signal.

Figure 15:
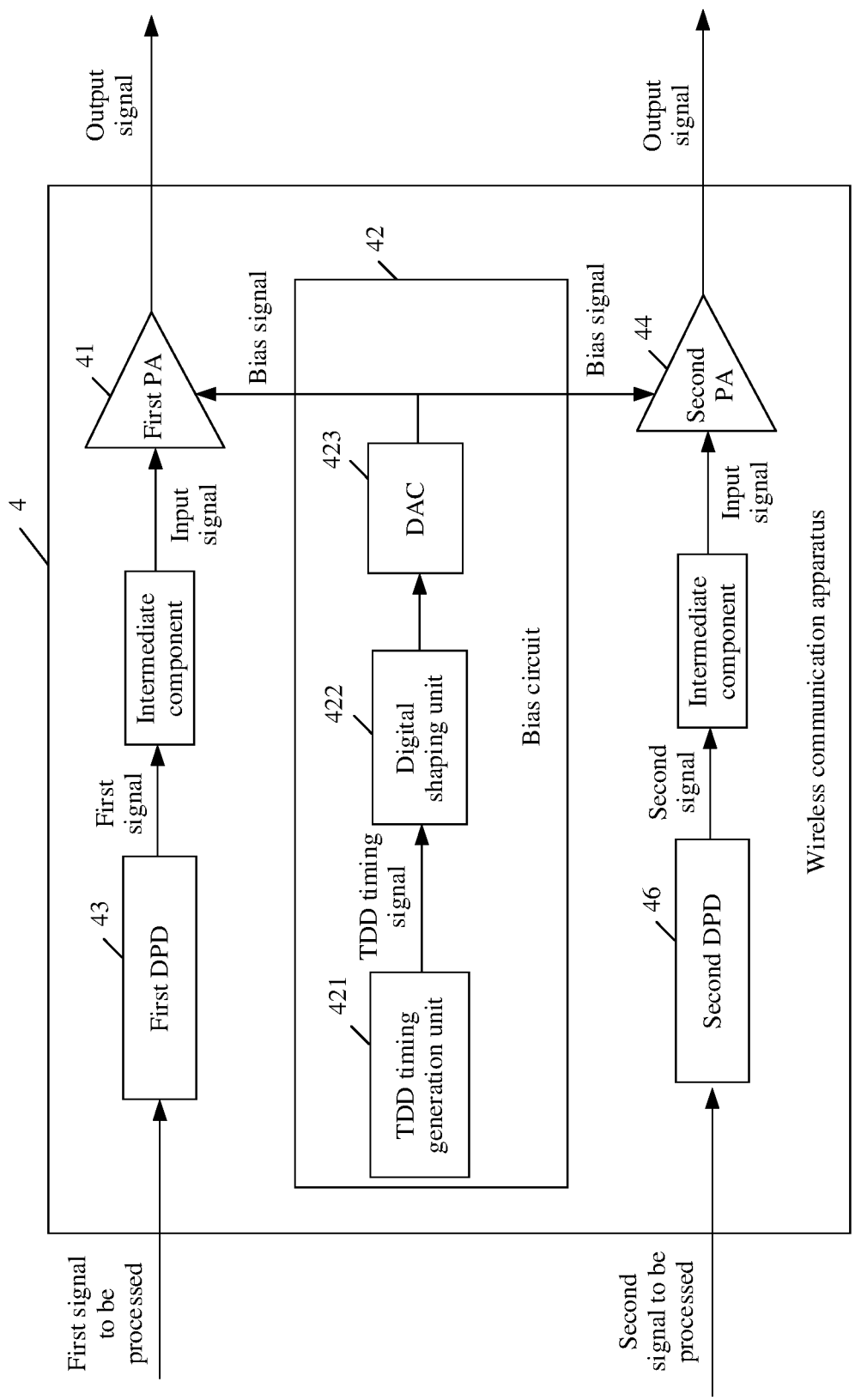
FIG. 15 is a schematic diagram 2 of a structure of a wireless communication apparatus used in a MIMO scenario according to an embodiment of this application.

FIG. 15 is a schematic diagram of a structure of a wireless communication apparatus 4 used in a MIMO scenario according to a first implementation of the foregoing manner 1. The technical solution may be applied to an ET-MIMO scenario, or may be applied to a non-ET-MIMO scenario. The wireless communication apparatus 4 includes a first sending channel and a second sending channel. The first sending channel includes the components/modules shown in FIG. 12A. The second sending channel includes a second DPD 46 and a second PA 44. The second DPD 46 is configured to process a second processed signal to obtain a second signal. After the second signal is processed by an intermediate component, an input signal is obtained. The input signal is sent to a signal input port of the second PA 44. A bias signal generated on the first sending channel is fed into a bias port of the second PA 44. The second PA 44 is configured to amplify, under control of the bias signal, the input signal to obtain an output signal. In this example, the bias signal may be further used to compensate for a self-bias effect of the second PA.

Optionally, a first processed signal and the second processed signal may be the same or may be different.

Figure 16:
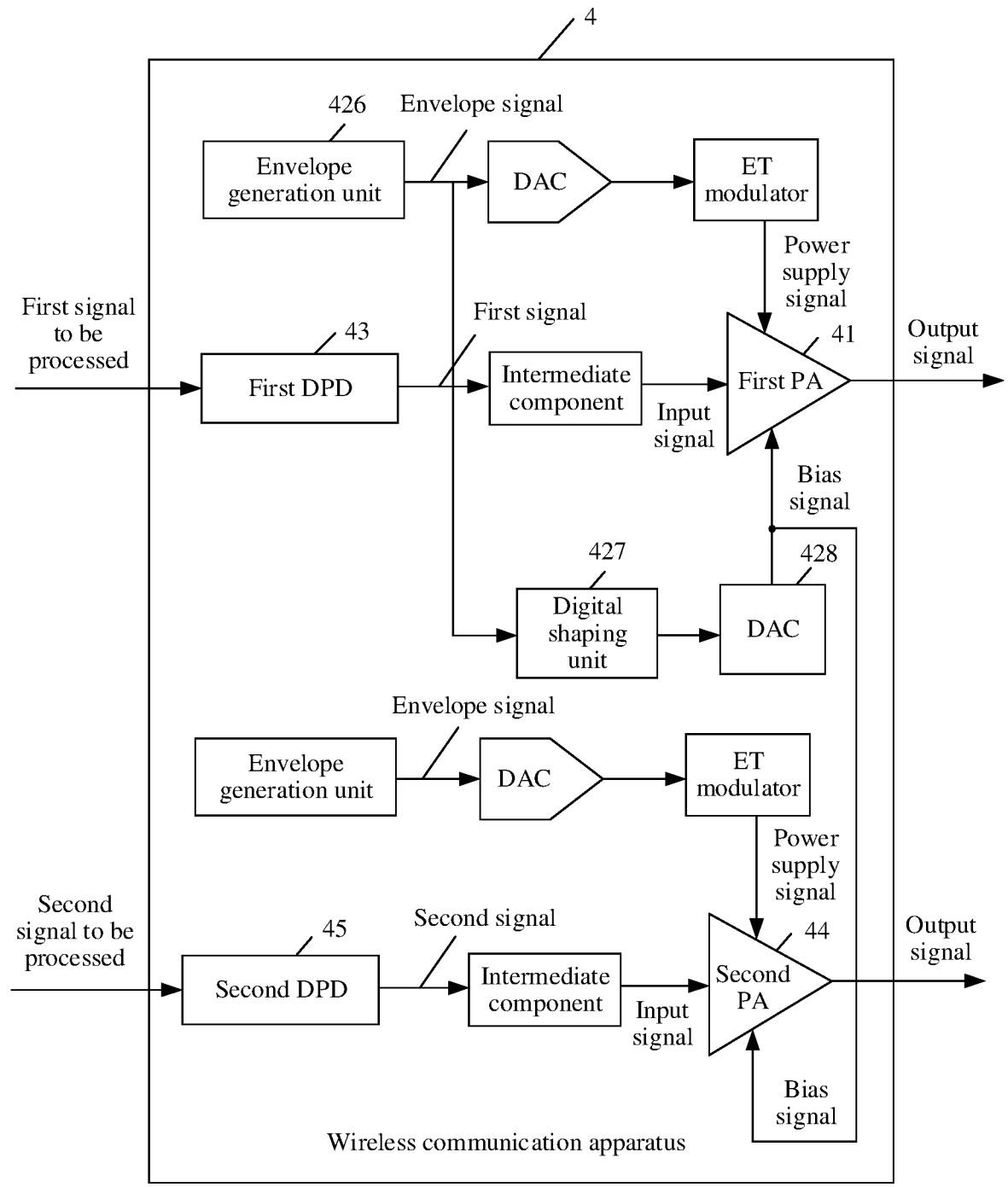
FIG. 16 is a schematic diagram 3 of a structure of a wireless communication apparatus used in a MIMO scenario according to an embodiment of this application.

FIG. 16 is a schematic diagram of a structure of a wireless communication apparatus 4 used in a MIMO scenario according to a first implementation of the foregoing manner 2. The technical solution may be applied to an ET-MIMO scenario. The wireless communication apparatus 4 includes a first sending channel and a second sending channel. The first sending channel includes the components/modules shown in FIG. 13A. For modules/components included in the second sending channel and functions of the modules/components, refer to the foregoing descriptions of the functions of the modules/components in the second sending channel in FIG. 15. Details are not described herein again.

It should be noted that, when the second implementation of the foregoing manner 1 and the second implementation of the foregoing manner 2 are applied to the MIMO scenario, different sending channels may share a configuration signal. This is not described herein.

It should be noted that, when the technical solutions mentioned above are applied to the MIMO scenario, a same manner (generating a configuration signal) is used for different sending channels. Extensible, different sending channels may generate the configuration signal in different manners. For example, the wireless communication device includes a first sending channel, a second sending channel, and a third sending channel. The first sending channel and the second sending channel share a bias signal, and the bias signal is generated based on the first implementation of manner 1. The third sending channel generates a configuration signal by using the first implementation of manner 2. Other examples are not enumerated.

The following describes a signal processing method provided in an embodiment of this application.

Figure 17:
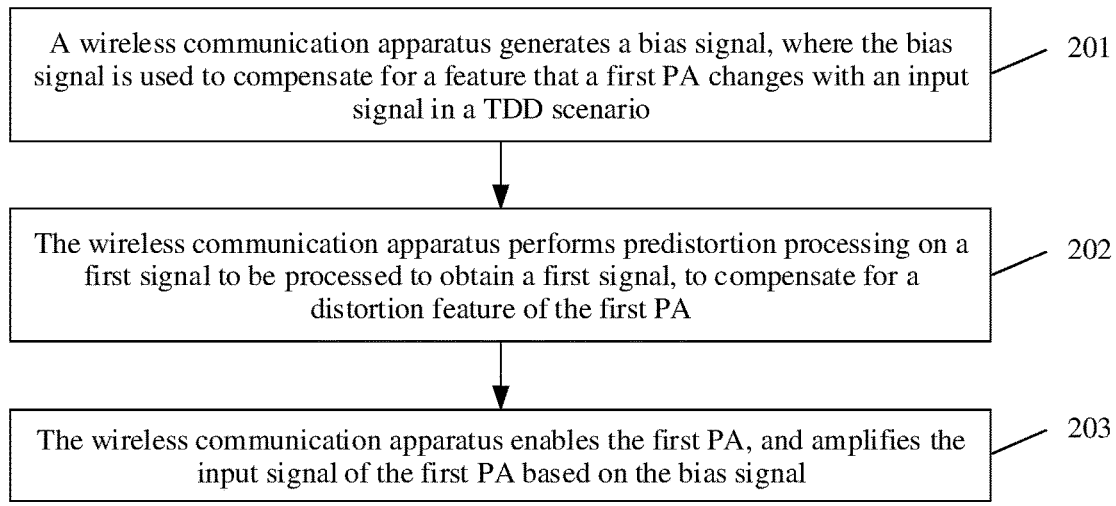
FIG. 17 is a schematic flowchart 1 of a signal processing method according to an embodiment of this application.

FIG. 17 is a schematic flowchart of a signal processing method according to an embodiment of this application. The method may be applied to a wireless communication apparatus, and the wireless communication apparatus includes a first PA. The wireless communication apparatus may be the wireless communication apparatus 4 provided above, and the first PA may be the first PA 41. The method includes the following steps S201 to S203.

S201: The wireless communication apparatus generates a bias signal, where the bias signal is used to compensate for a feature that the first PA changes with an input signal in a TDD scenario. Refer to any wireless communication apparatus 4 provided above. S201 may be performed by the bias circuit 42.

Optionally, the wireless communication apparatus generates the bias signal based on a switch signal of the first PA or a TDD timing signal. For example, first, the TDD timing signal is generated. Then, the TDD timing signal is shaped, and digital-to-analog conversion is performed on a shaped signal to obtain the bias signal. Alternatively, digital-to-analog conversion is performed on the TDD timing signal to obtain an analog signal of the TDD timing signal. The analog signal of the TDD timing signal is shaped to obtain the bias signal.

Optionally, in an ET system, the wireless communication apparatus generates the bias signal based on an envelope signal of the ET system. For example, first, the envelope signal is generated. Then, the envelope signal is shaped, and digital-to-analog conversion is performed on a filtered signal to obtain the bias signal. Alternatively, digital-to-analog conversion is performed on the envelope signal to obtain an analog signal of the envelope signal. The analog signal is shaped to obtain the bias signal.

For example, refer to the foregoing description. Generating the TDD timing signal may be performed by the TDD timing generation unit 421. Generating the envelope signal may be performed by the envelope generation unit 426. Shaping a digital signal (for example, the TDD timing signal or the envelope signal) may be performed by a digital shaping unit, and shaping an analog signal (for example, the analog signal of the TDD timing signal or the analog signal of the envelope signal) may be performed by an analog shaping unit. Digital-to-analog conversion may be performed by a DAC.

S202: The wireless communication apparatus performs predistortion processing on a first signal to be processed to obtain a first signal, to compensate for a distortion feature of the first PA. Refer to any wireless communication apparatus 4 provided above. S202 may be performed by the first DPD 43.

An execution sequence of S201 and S202 is not limited in this embodiment of this application.

S203: The wireless communication apparatus enables the first PA, and amplifies the input signal of the first PA based on the bias signal. The input signal of the first PA is generated based on the first signal. Refer to the wireless communication apparatus 4 provided above. Amplifying may be performed by the first PA 41.

Figure 18:
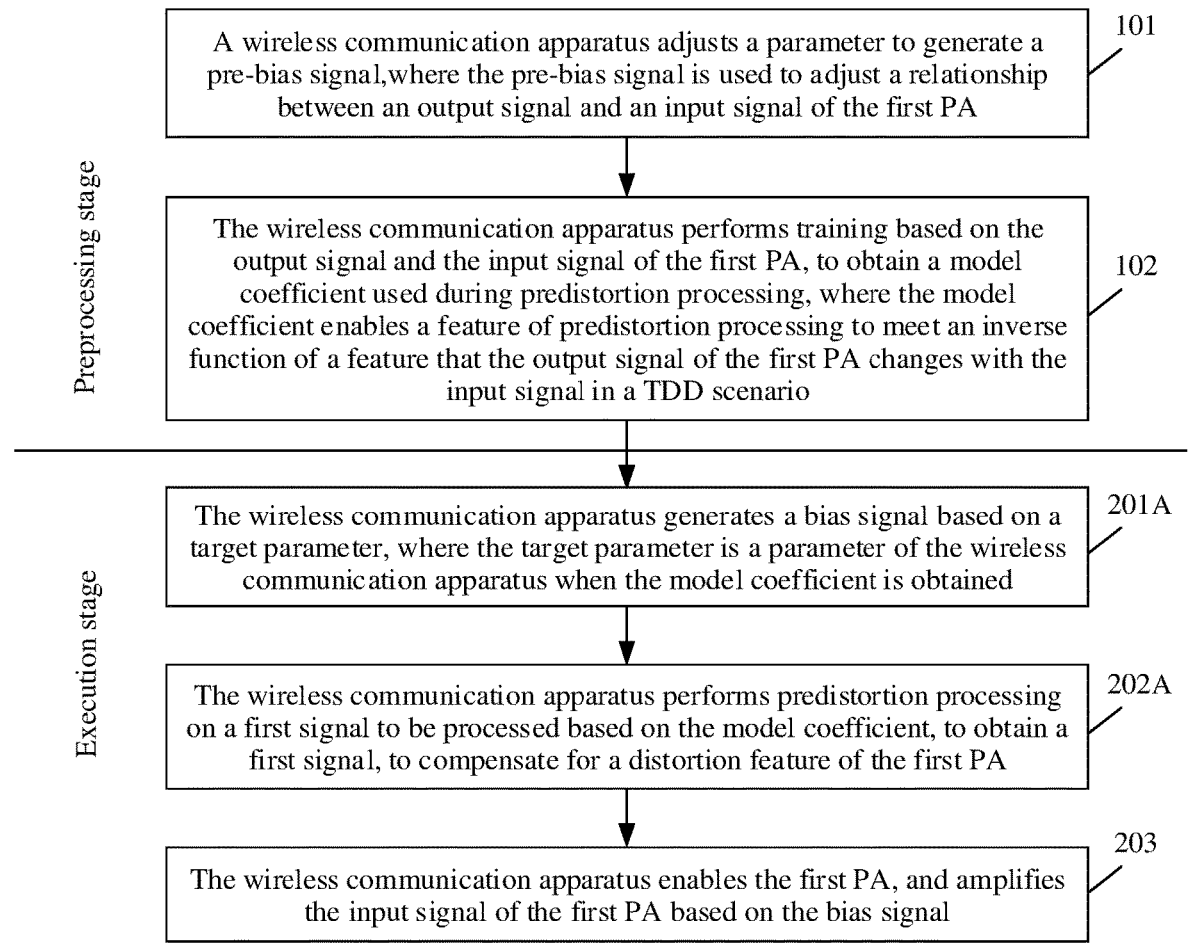
FIG. 18 is a schematic flowchart 2 of a signal processing method according to an embodiment of this application.

For example, S201 to S203 may be considered as an execution stage, and are specifically a stage in which signal amplification is performed. During actual implementation, optionally, before the execution stage, the foregoing method may further include a preprocessing stage, which is specifically a stage of obtaining a model parameter used for predistortion processing and the bias signal of the first PA. Specifically, as shown in FIG. 18, the preprocessing stage may include S101 to S102.

S101: A wireless communication apparatus adjusts a parameter of the wireless communication apparatus to generate a pre-bias signal, where the bias signal is a pre-bias signal that meets compensating for a feature that a first PA changes with an input signal in a TDD scenario, and the pre-bias signal is used to adjust a relationship between an output signal and the input signal of the first PA. Refer to the wireless communication apparatus 4 provided in FIG. 11B. Adjustment may be performed by the bias circuit 42.

S102: The wireless communication apparatus performs training based on the output signal and the input signal of the first PA, to obtain a model coefficient used during predistortion processing, where the model coefficient enables a feature of predistortion processing to meet an inverse function of a feature that the output signal of the first PA changes with the input signal in the TDD scenario. Refer to the wireless communication apparatus 4 provided in FIG. 11B. Training may be performed by the training unit 40. Optionally, the wireless communication apparatus performs training based on the output signal and the input signal of the first PA and a model extraction algorithm, to obtain the model coefficient used during predistortion processing. The model extraction algorithm includes a least square method or a least mean square error algorithm.

In this case, S201 may include S201A: The wireless communication apparatus generates a bias signal based on a target parameter, where the target parameter is a parameter of the wireless communication apparatus when the model coefficient is obtained.

In this case, S202 may include S202A: The wireless communication apparatus performs predistortion processing on a first signal to be processed based on the model coefficient, to obtain a first signal, to compensate for a distortion feature of the first PA.

Figure 19:
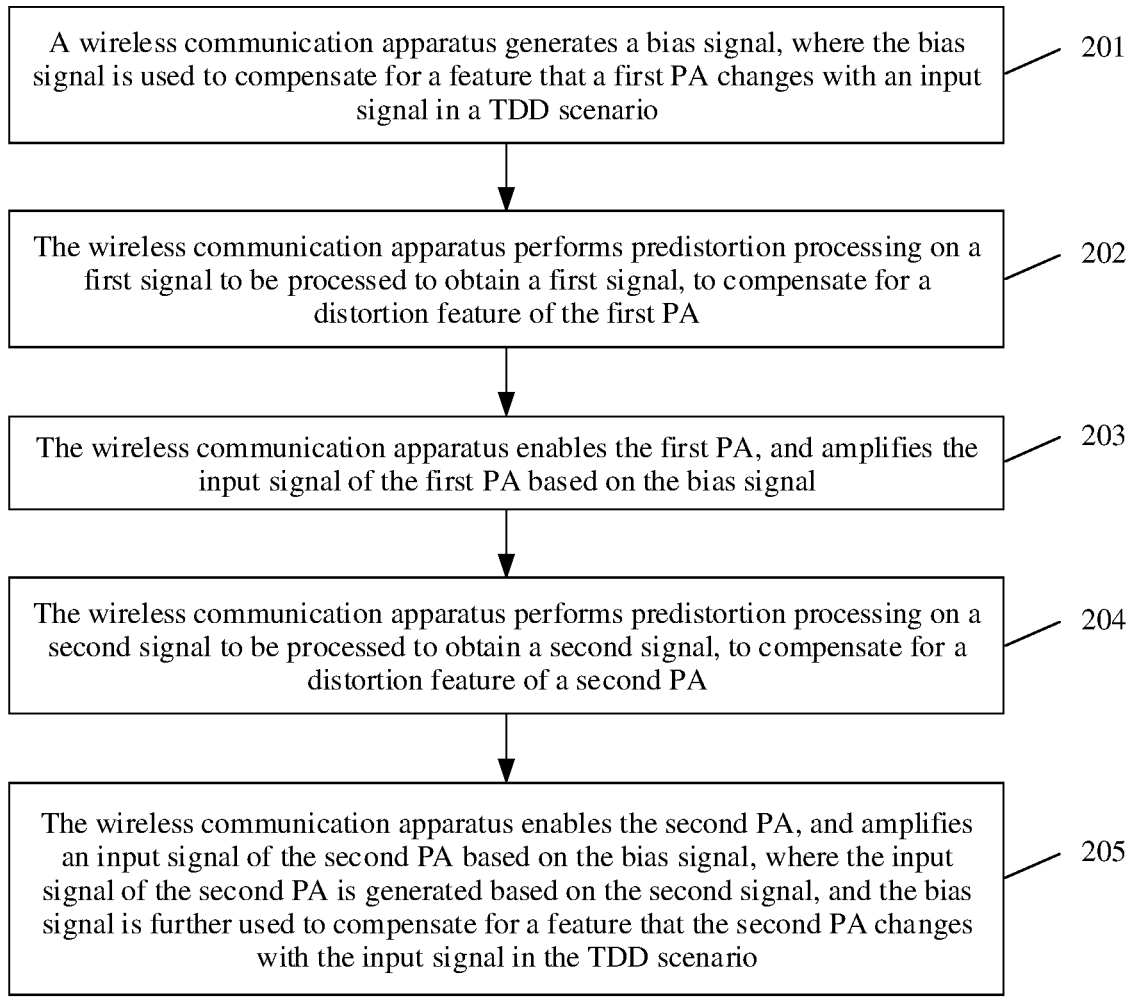
FIG. 19 is a schematic flowchart 3 of a signal processing method according to an embodiment of this application.

Optionally, the wireless communication apparatus includes a first sending channel and a second sending channel. The first sending channel includes the first PA, and the second sending channel includes a second PA. In this case, based on FIG. 18, the method further includes S204 to S205, as shown in FIG. 19. Details are as follows.

S204: The wireless communication apparatus performs predistortion processing on a second signal to be processed to obtain a second signal, to compensate for a distortion feature of the second PA. Refer to the wireless communication apparatus 4 provided in FIG. 14. S204 may be performed by the second DPD 44.

S205: The wireless communication apparatus enables the second PA, and amplifies an input signal of the second PA based on the bias signal, where the input signal of the second PA is generated based on the second signal. The bias signal is further used to compensate for a feature that the second PA changes with the input signal in the TDD scenario. Refer to the wireless communication apparatus 4 provided in FIG. 14. S205 may be performed by the second PA 45.

An execution sequence of S202 to S203 and S204 to S205 is not limited in this embodiment of this application. For example, S202 to S203 may be performed before S204 to S205, or S204 to S205 are performed when S202 to S203 are performed.

For specific descriptions of related content in any one of the foregoing steps, refer to the descriptions in the foregoing wireless communication apparatus 4. Details are not described herein again. In addition, for descriptions of beneficial effects of any method provided above, refer to the descriptions in the foregoing corresponding wireless communication apparatus 4. Details are not described again.

Another embodiment of this application further provides a computer-readable storage medium. The computer-readable storage medium stores instructions. When the instructions are used by a terminal, the steps performed by the terminal in the method procedure shown in the foregoing method embodiment are performed.

In some embodiments, the disclosed methods may be implemented as computer program instructions encoded in a machine-readable format on a computer-readable storage medium or encoded on another non-transitory medium or product.

It should be understood that the arrangement described herein is merely used as an example. Thus, persons skilled in the art appreciate that another arrangement and another element (for example, a machine, an interface, a function, a sequence, and an array of functions) can be used to replace the arrangement, and some elements may be omitted together depending on a desired result. In addition, many of the described elements are functional entities that can be implemented as discrete or distributed components, or implemented in any suitable combination at any suitable position in combination with another component.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer-executable instructions are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but the protection scope of this application is not limited thereto. Any variation or replacement that can be readily figured out by the person skilled in the art within the technical scope disclosed in this application shall fall within the protection scope of this application. Therefore, the protection scope of this application shall be subject to the protection scope of the claims.

What is claimed is:

1. An apparatus, comprising:
a power amplifier, comprising:
a signal input port, configured to receive a first radio frequency signal;
a signal output port, configured to output a second radio frequency signal obtained after power amplification;
a power supply port, configured to receive a power supply signal; and
a bias port, configured to receive a bias signal; and
a bias circuit, connected to the bias port, wherein the bias circuit is configured to generate the bias signal, wherein a start time point of a rising stage of the bias signal is synchronized with a start time point of a rising stage of a switch signal of the power amplifier in a time division duplex (TDD) scenario and a start time point of a falling stage of the bias signal is synchronized with a start time point of a falling stage of the switch signal of the power amplifier in the TDD scenario, to compensate for a nonlinear change of the power amplifier in the TDD scenario.

2. The apparatus according to claim 1, wherein the bias circuit comprises:
circuitry that is configured to:
receive the switch signal of the power amplifier; and
perform smooth filtering on the switch signal of the power amplifier, to generate the bias signal.

3. The apparatus according to claim 2, wherein the bias circuit further comprises:
circuitry configured to:
generate the switch signal of the power amplifier.

4. The apparatus according to claim 1, wherein the bias circuit comprises:
circuitry configured to:
receive a TDD timing signal; and
perform smooth filtering on the TDD timing signal, to generate the bias signal.

5. The apparatus according to claim 4, wherein the bias circuit further comprises:
circuitry configured to:
generate the TDD timing signal.

6. The apparatus according to claim 1, wherein the apparatus is used in an envelope tracking (ET) system; and wherein the bias circuit further comprises:
circuitry configured to:
receive an envelope signal of the ET system; and
perform smooth filtering on the envelope signal, to generate the bias signal.

7. The apparatus according to claim 6, wherein the bias circuit further comprises:
circuitry configured to:
generate the envelope signal.

8. The apparatus according to claim 1, comprising a plurality of power amplifiers and at least one bias circuit, wherein the at least one bias circuit is connected to bias ports of the plurality of power amplifiers.

9. The apparatus according to claim 8, wherein the plurality of power amplifiers respectively belong to different radio frequency transmit channels, and the different radio frequency transmit channels are used for multiple-input multiple-output (MIMO) communication.

10. The apparatus according to claim 1, wherein the apparatus is integrated into:
a radio frequency front-end (RFFE) component; or
a radio frequency integrated circuit (RFIC); or
an envelope tracking (ET) chip.

11. A method comprising:
generating a bias signal, wherein a start time point of a rising stage of the bias signal is synchronized with a start time point of a rising stage of a switch signal of a power amplifier in a time division duplex (TDD) scenario and a start time point of a falling stage of the bias signal is synchronized with a start time point of a falling stage of the switch signal of the power amplifier in the TDD scenario, to compensate for a nonlinear change of the power amplifier in the TDD scenario; and enabling the power amplifier, and amplifying, based on the bias signal and a power supply signal, a radio frequency signal input to the power amplifier.

12. The method according to claim 11, wherein generating the bias signal comprises:

performing smooth filtering on the switch signal of the power amplifier, to generate the bias signal.

13. The method according to claim 12, further comprising:

generating the switch signal of the power amplifier.

14. The method according to claim 11, wherein generating the bias signal comprises:

performing smooth filtering on a TDD timing signal, to generate the bias signal.

15. The method according to claim 14, further comprising:

generating the TDD timing signal.

16. The method according to claim 11, wherein the method is used in an envelope tracking (ET) system, and generating the bias signal comprises:

performing smooth filtering on an envelope signal of the ET system, to generate the bias signal.

17. The method according to claim 16, further comprising:

generating the envelope signal.

18. The method according to claim 11, wherein a plurality of power amplifiers share the bias signal.

19. The method according to claim 18, wherein the plurality of power amplifiers respectively belong to different radio frequency transmit channels, and the different radio frequency transmit channels are used for multiple-input multiple-output (MIMO) communication.

20. A non-transitory computer-readable storage medium, comprising a computer program, wherein when the computer program is run on an apparatus which comprises a power amplifier, the apparatus is enabled to perform operations comprising:

generating a bias signal, wherein a start time point of a rising stage of the bias signal is synchronized with a start time point of a rising stage of a switch signal of the power amplifier in a time division duplex (TDD) scenario and a start time point of a falling stage of the bias signal is synchronized with a start time point of a falling stage of the switch signal of the power amplifier in the TDD scenario, to compensate for a nonlinear change of the power amplifier in the TDD scenario; and enabling the power amplifier, and amplifying, based on the bias signal and a power supply signal, a radio frequency signal input to the power amplifier.

* * * * *